TELEPHONE PARTY LINE LOCKOUT SYSTEM

Original Filed Feb. 8, 1957 13 Sheets-Sheet 1

INVENTOR.
CLARENCE E. LOMAX
BY C. A. Gulbrandsen
ATTY.

TELEPHONE PARTY LINE LOCKOUT SYSTEM

Original Filed Feb. 8, 1957 13 Sheets-Sheet 2

INVENTOR.
CLARENCE E. LOMAX
BY
C. A. Gulbrandsen
ATTY.

Aug. 1, 1961 C. E. LOMAX 2,994,742

TELEPHONE PARTY LINE LOCKOUT SYSTEM

Original Filed Feb. 8, 1957 13 Sheets-Sheet 3

INVENTOR.
CLARENCE E. LOMAX
BY
C. A. Gulbrandsen
ATTY.

Aug. 1, 1961 C. E. LOMAX 2,994,742

TELEPHONE PARTY LINE LOCKOUT SYSTEM

Original Filed Feb. 8, 1957 13 Sheets-Sheet 4

INVENTOR.
CLARENCE E. LOMAX

BY C. A. Gulbrandsen

ATTY.

INVENTOR.
CLARENCE E. LOMAX
BY C. A. Gulbrandsen
ATTY.

TELEPHONE PARTY LINE LOCKOUT SYSTEM

Original Filed Feb. 8, 1957 13 Sheets-Sheet 6

FIG.6 STA. D

INVENTOR.
CLARENCE E. LOMAX

BY

ATTY.

INVENTOR.
CLARENCE E. LOMAX
BY C. A. Gulbrandsen
ATTY.

TELEPHONE PARTY LINE LOCKOUT SYSTEM

Original Filed Feb. 8, 1957 13 Sheets-Sheet 8

INVENTOR.
CLARENCE E. LOMAX
BY C. A. Gullbrandsen
ATTY.

INVENTOR.
CLARENCE E. LOMAX
BY C. A. Gullbrandsen
ATTY.

TELEPHONE PARTY LINE LOCKOUT SYSTEM

Original Filed Feb. 8, 1957 13 Sheets-Sheet 10

INVENTOR.
CLARENCE E. LOMAX

BY C. A. Gulbrandsen

ATTY.

TELEPHONE PARTY LINE LOCKOUT SYSTEM

Original Filed Feb. 8, 1957 13 Sheets-Sheet 11

INVENTOR.
CLARENCE E. LOMAX
BY C. A. Gulbrandsen
ATTY.

INVENTOR.
CLARENCE E. LOMAX
BY C. A. Gulbrandsen
ATTY.

Aug. 1, 1961 C. E. LOMAX 2,994,742
TELEPHONE PARTY LINE LOCKOUT SYSTEM
Original Filed Feb. 8, 1957 13 Sheets-Sheet 13
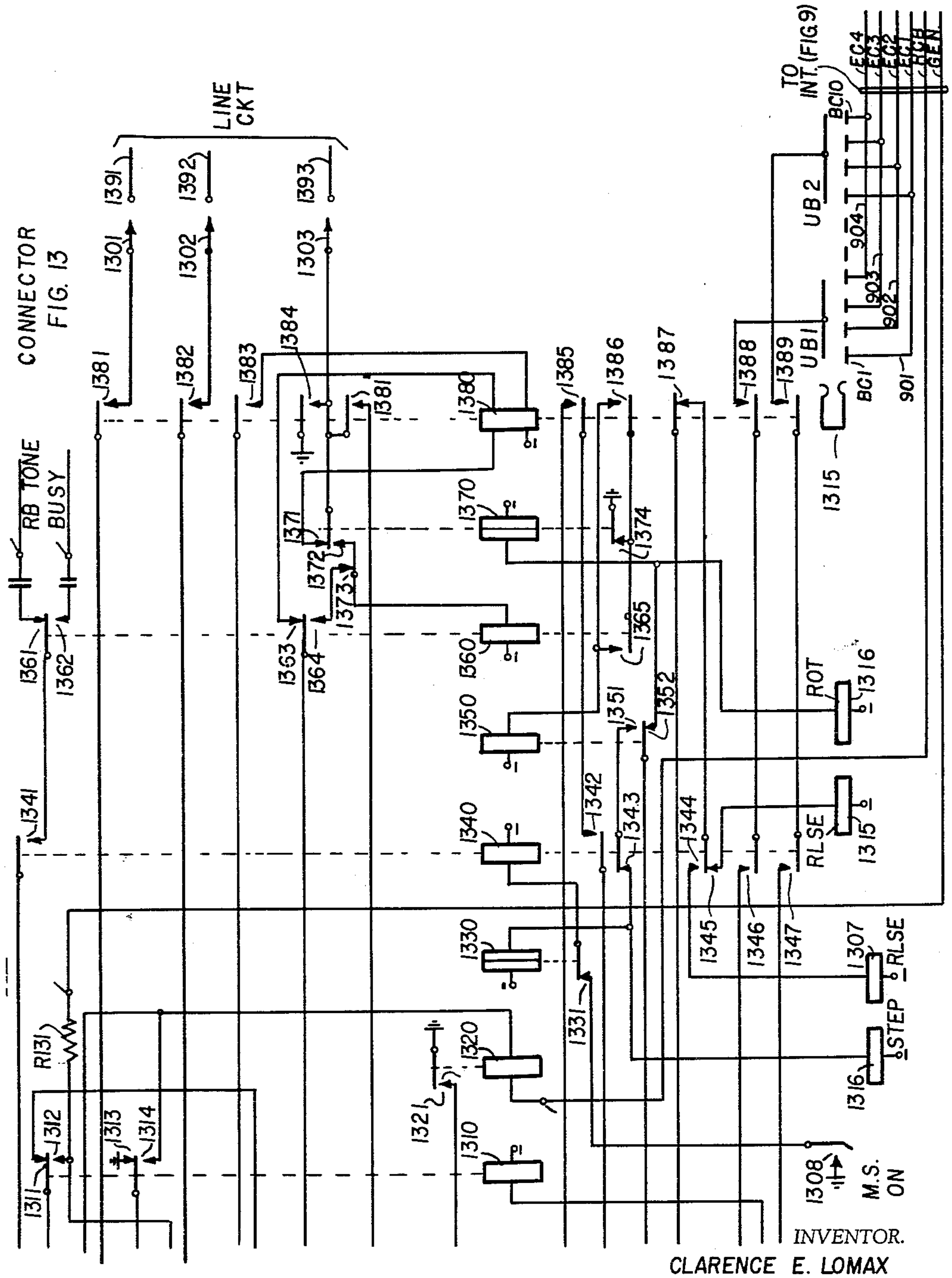
CONNECTOR FIG. 13
INVENTOR.
CLARENCE E. LOMAX
BY C. A. Gulbrandsen
ATTY.

2,994,742
Patented Aug. 1, 1961

2,994,742

TELEPHONE PARTY LINE LOCKOUT SYSTEM

Clarence E. Lomax, Hastings, Nebr., assignor to Automatic Electric Laboratories, Inc., a corporation of Delaware Original application Feb. 8, 1957, Ser. No. 638,940. Divided and this application Dec. 5, 1958, Ser. No. 778,500
8 Claims. (Cl. 179—17)

The present invention relates in general to telephone systems and more particularly to multi-party line telephone systems.

This application is a division of the copending application of Clarence E. Lomax, Serial No. 638,940, filed February 8, 1957.

The main object of the present invention is to provide an improved party line lockout arrangement to lock out all but the calling and called parties to provide secret service and may be considered as a direct improvement on the invention disclosed in the application of Alfred H. Faulkner, filed June 15, 1955, Serial No. 515,683, now Patent No. 2,910,543.

One feature of this lockout arrangement is the provision of means whereby the calling and called parties are locked out for a predetermined time, say 3 or 5 minutes, after which the lockout is removed and secret service is disabled.

Another feature relates to means for transmitting a warning tone just prior to the removal of the lockout to advise the subscribers that the lockout is about to be disabled.

A further feature in connection with this lockout arrangement is to maintain the lockout on a toll connection to a called party line until the toll connection is released regardless of the length of conversation.

A still further feature relates to the means whereby when a reverting call to another subscriber on the same line is made the lockout on such party line is removed.

Other objects and features of this invention will be apparent from the following description when read in connection with the accompanying drawings in which certain embodiments of the invention are illustrated.

Referring to the drawings,

FIG. 1A also includes a group of party lines having party line lockout.

Figure 2:
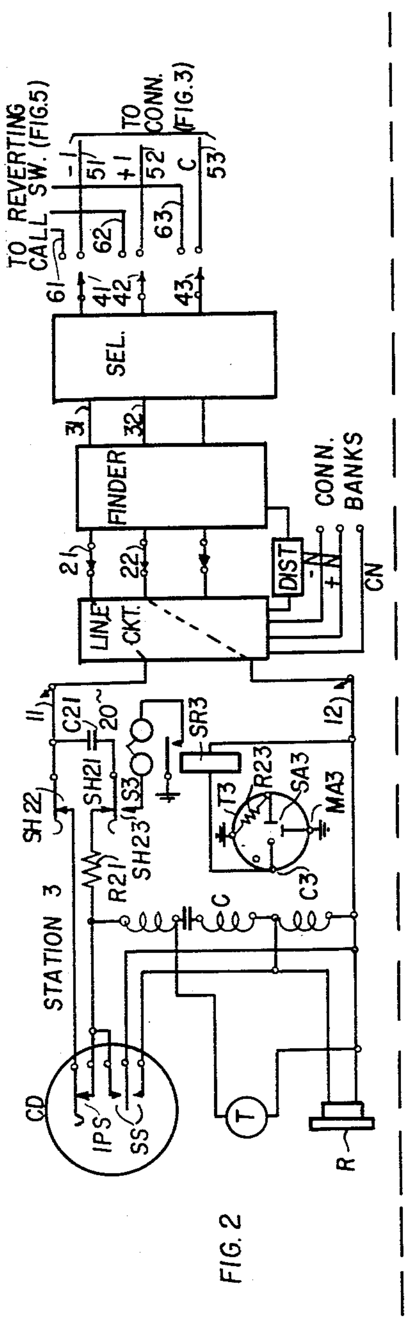
FIG. 2 shows one of the subscriber stations in the system of FIG. 1 and a well-known line circuit, finder and distributor, and selector switch.
Figure 2A:
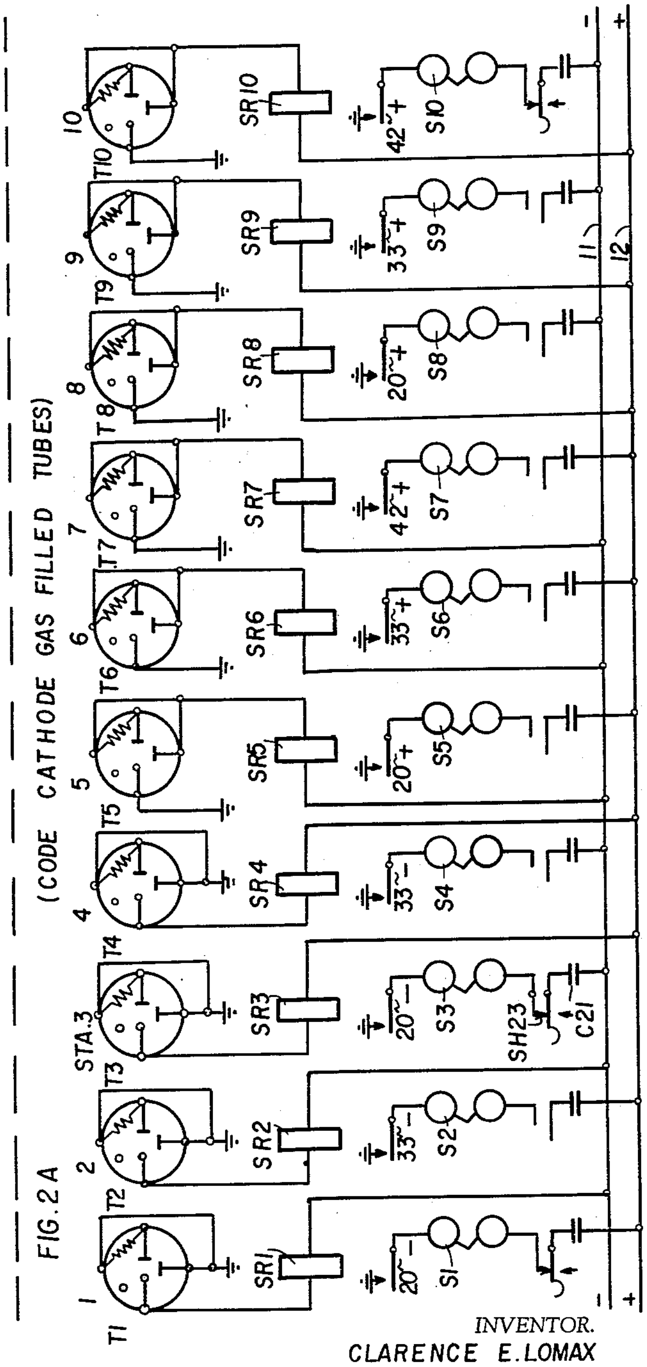

FIG. 2A diagrammatically illustrates the signaling apparatus of ten stations on one of the party lines, one of these stations being the station illustrated in FIG. 2.

Figure 3:
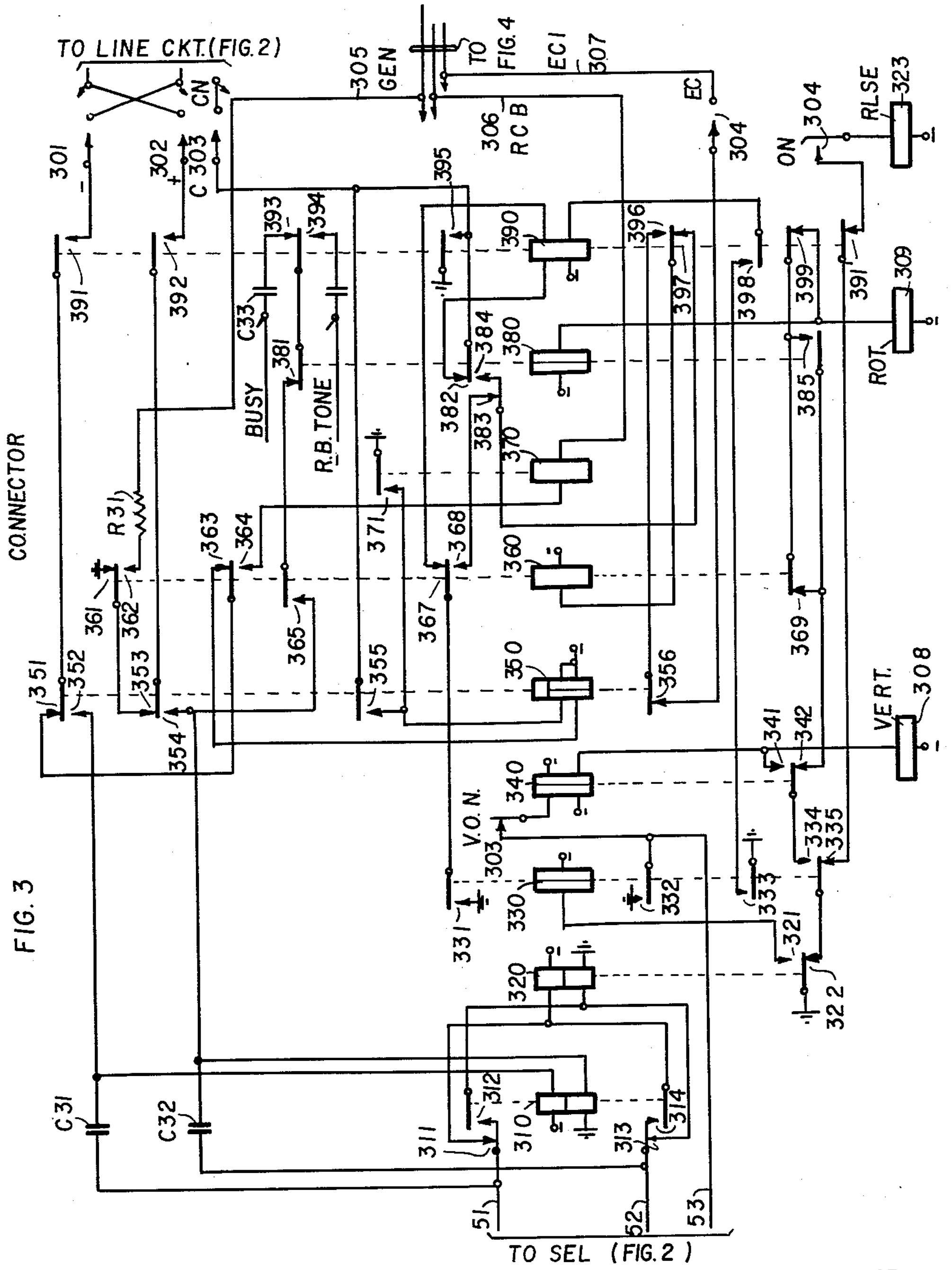

FIG. 3 shows the circuits of an improved connector switch for use in a selective party line ringing system of the terminal per station type.

Figure 4:
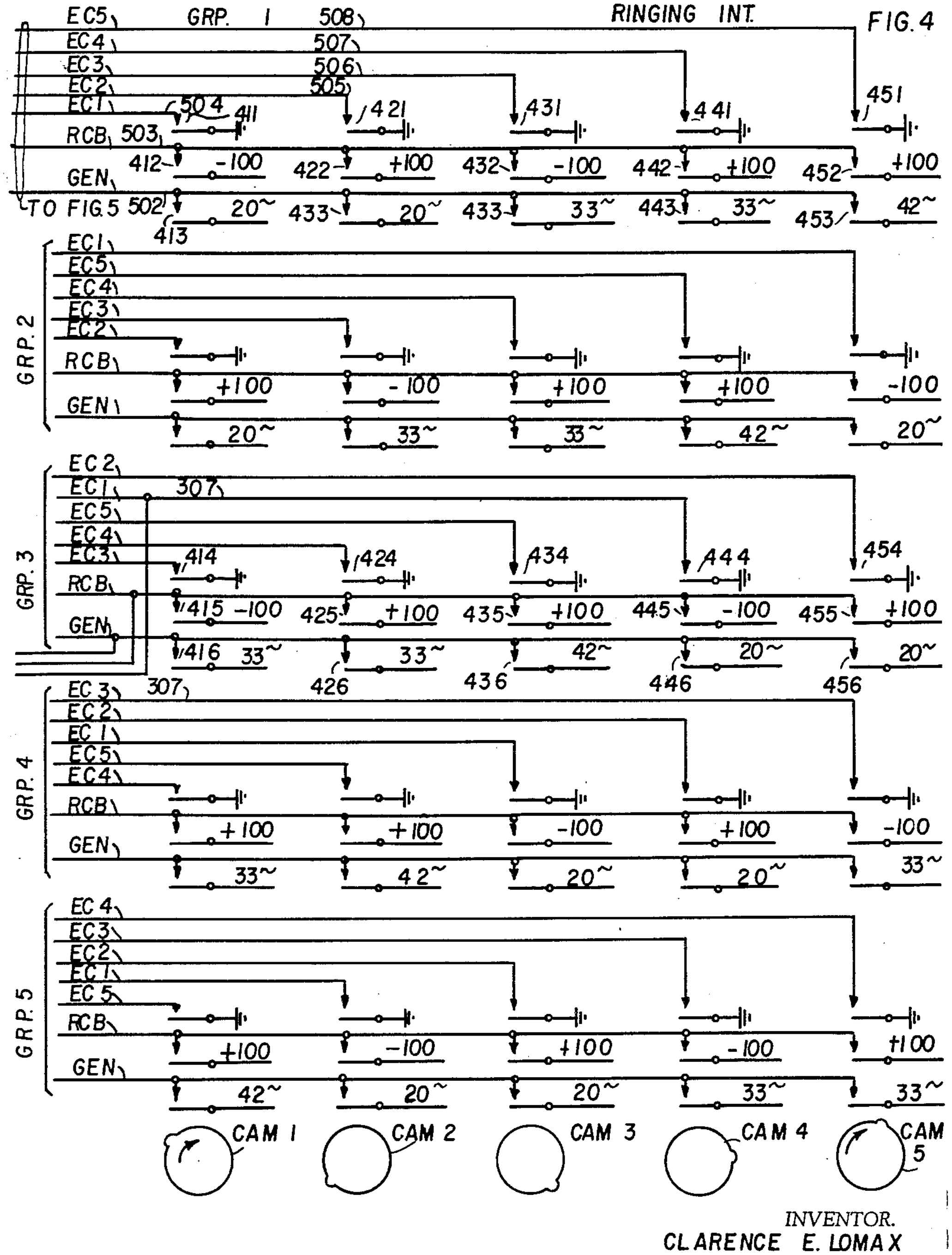

FIG. 4 shows the common ringing interrupter for use with the connector switches such as shown in FIG. 2.

Figure 1:
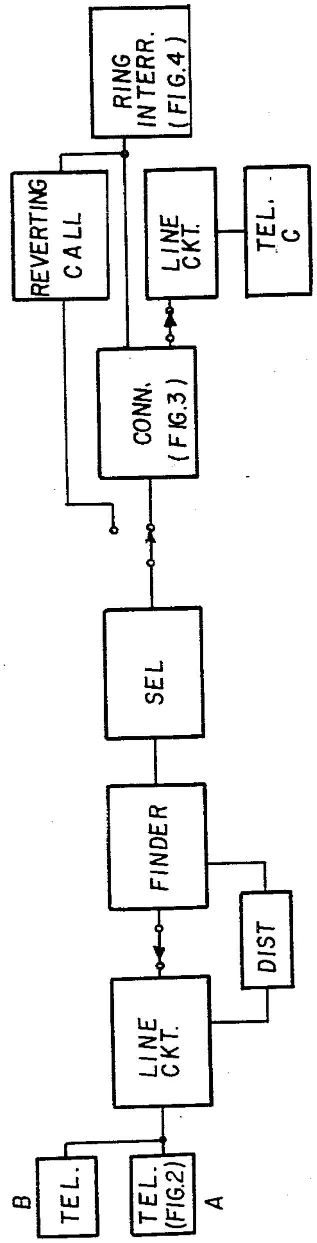
FIG. 1 is a diagrammatic illustration of one modification of the invention using different frequencies for the ringing current in the above-mentioned bi-lateral ringing arrangement in a selective party line ringing system of the terminal per station type.
Figure 5:
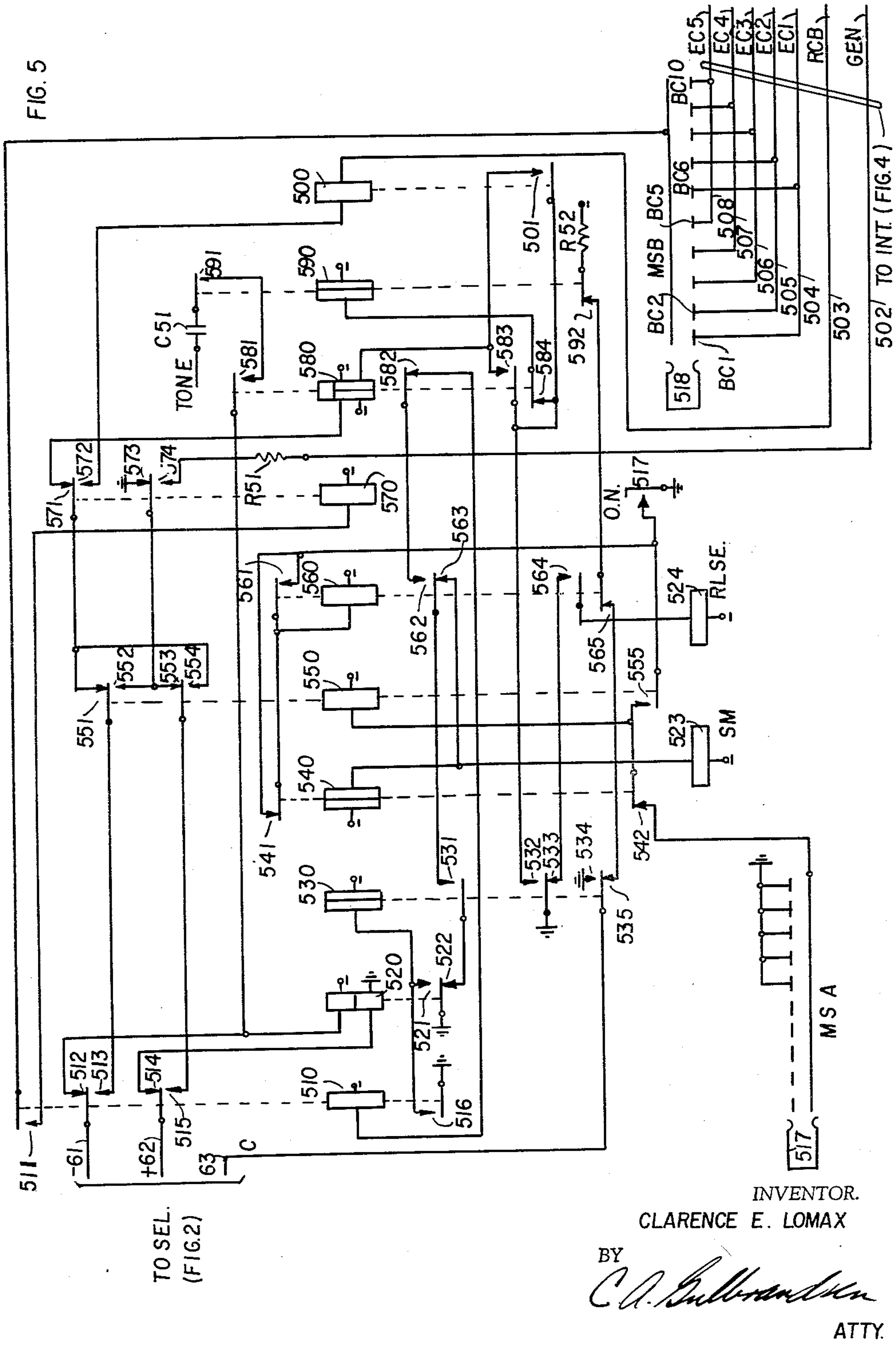

FIG. 5 shows a reverting call switch for use in the system illustrated in FIG. 1.

Figure 1A:
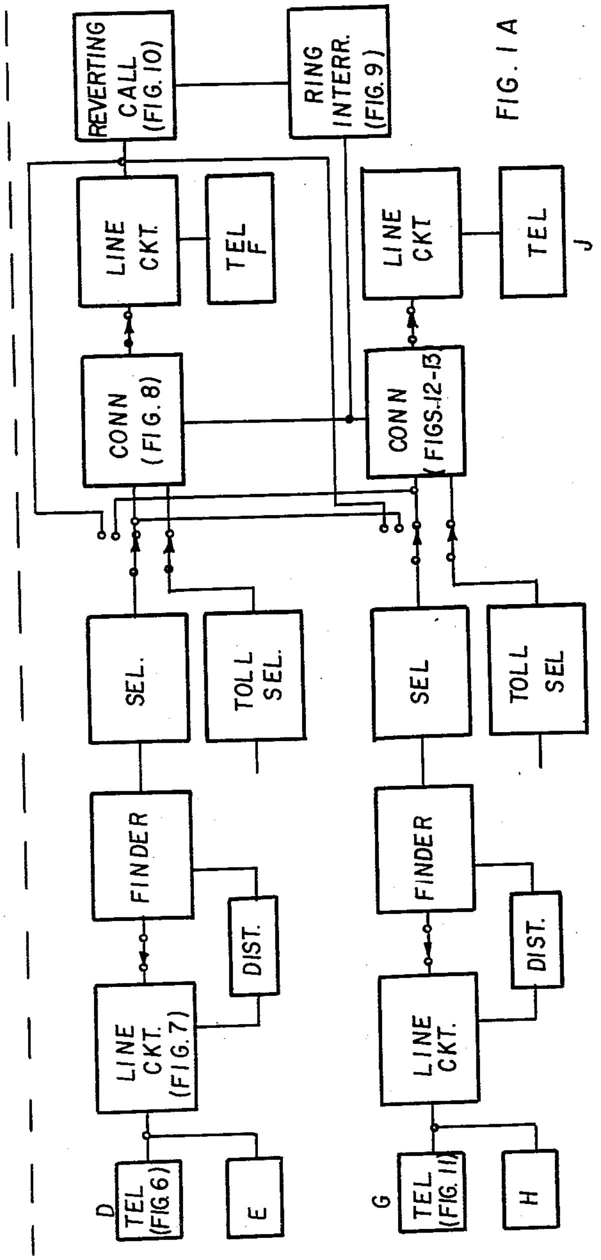
FIG. 1A is a diagrammatic illustration of another modification using superimposed negative or positive potential of a given frequency for the ringing current in the above-mentioned bi-lateral arrangement in a selective party line system of both the terminal per station and terminal per line type.
Figure 6A:
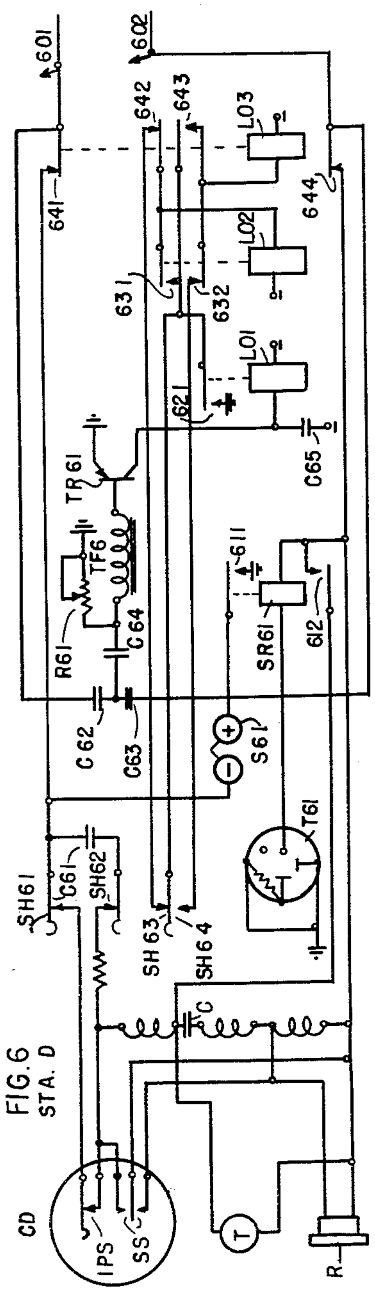
Figure 6A:
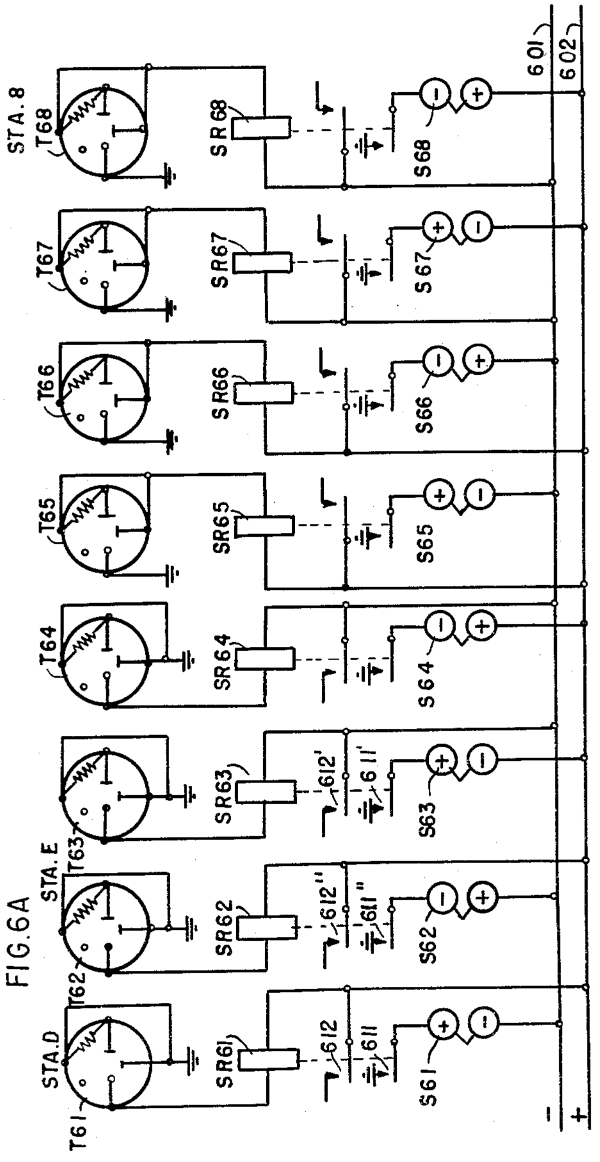

FIG. 6 shows one of the subscriber stations arranged for party line lockout for use in the system illustrated in FIG. 1A.

FIG. 6A diagrammatically shows the signaling apparatus of eight stations on one of the party lines, one of these stations being the station illustrated in FIG. 6.

Figure 7:
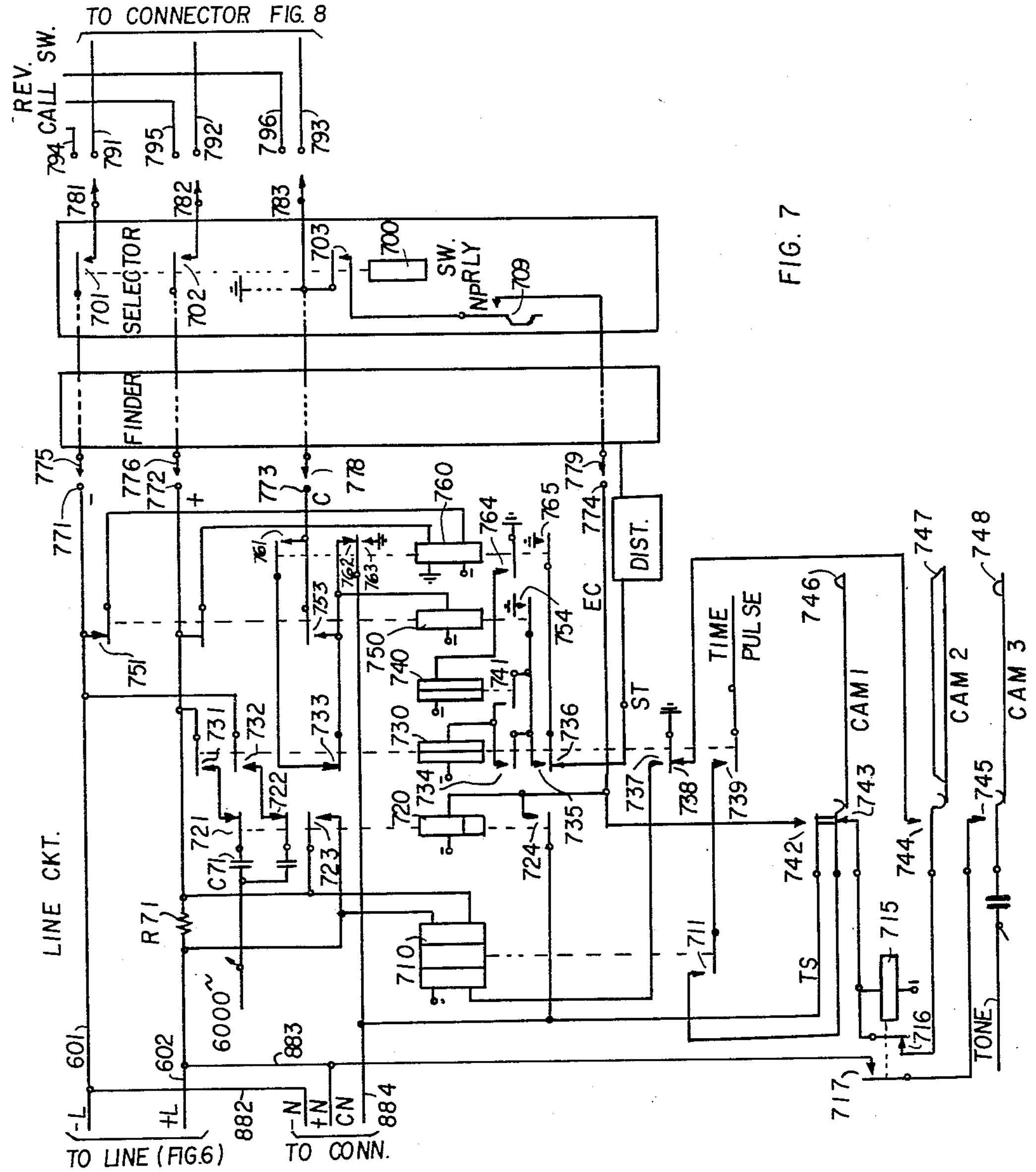

FIG. 7 shows the line circuit for use on one of the party lines having party line lockout as shown in FIG. 6. This figure also diagrammatically illustrates a well-known finder and its distributor and a well-known selector switch.

Figure 8:
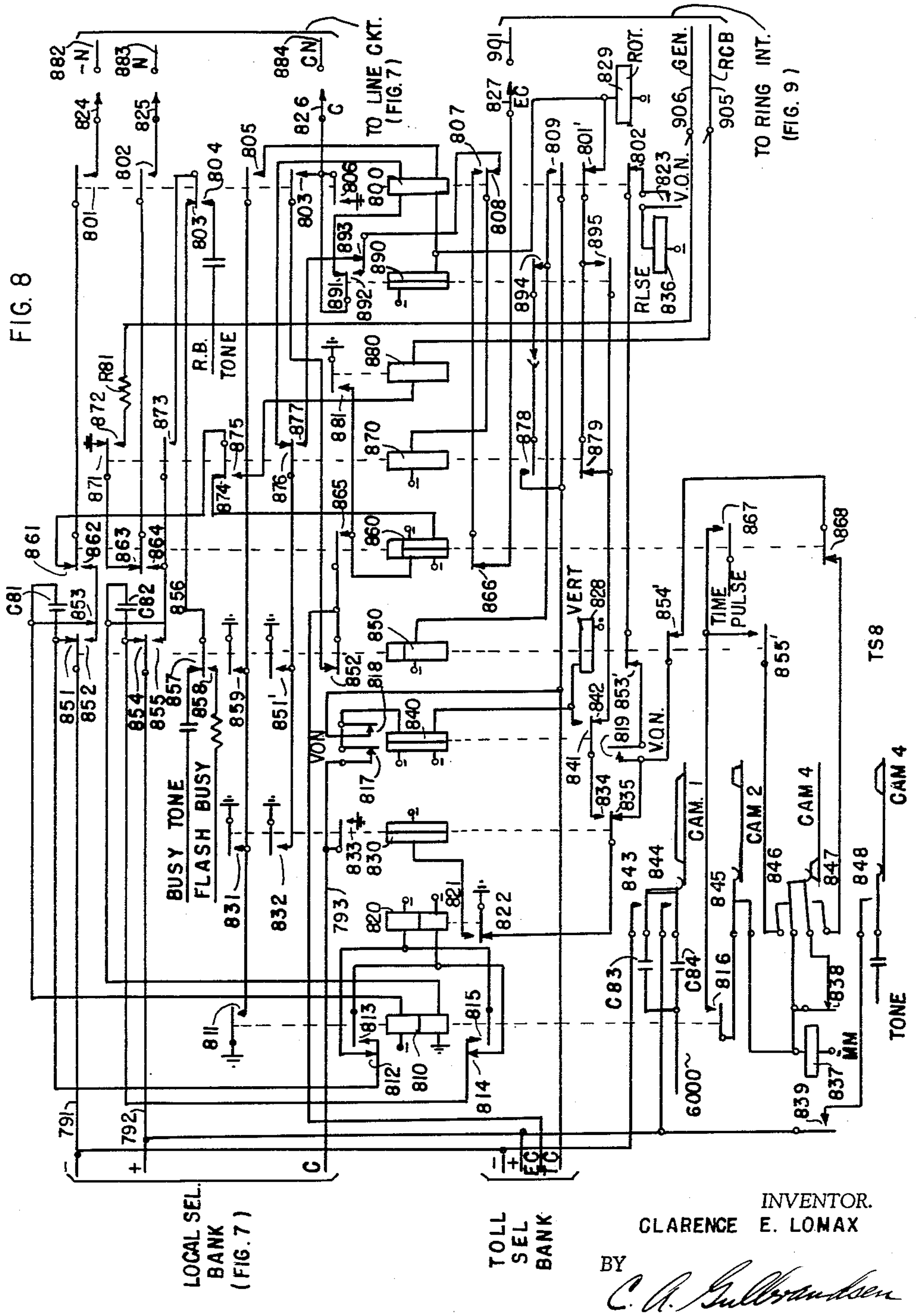

FIG. 8 shows the circuits of an improved connector switch for use in a party line lockout system having selective party line ringing of the terminal per station type.

Figure 9:
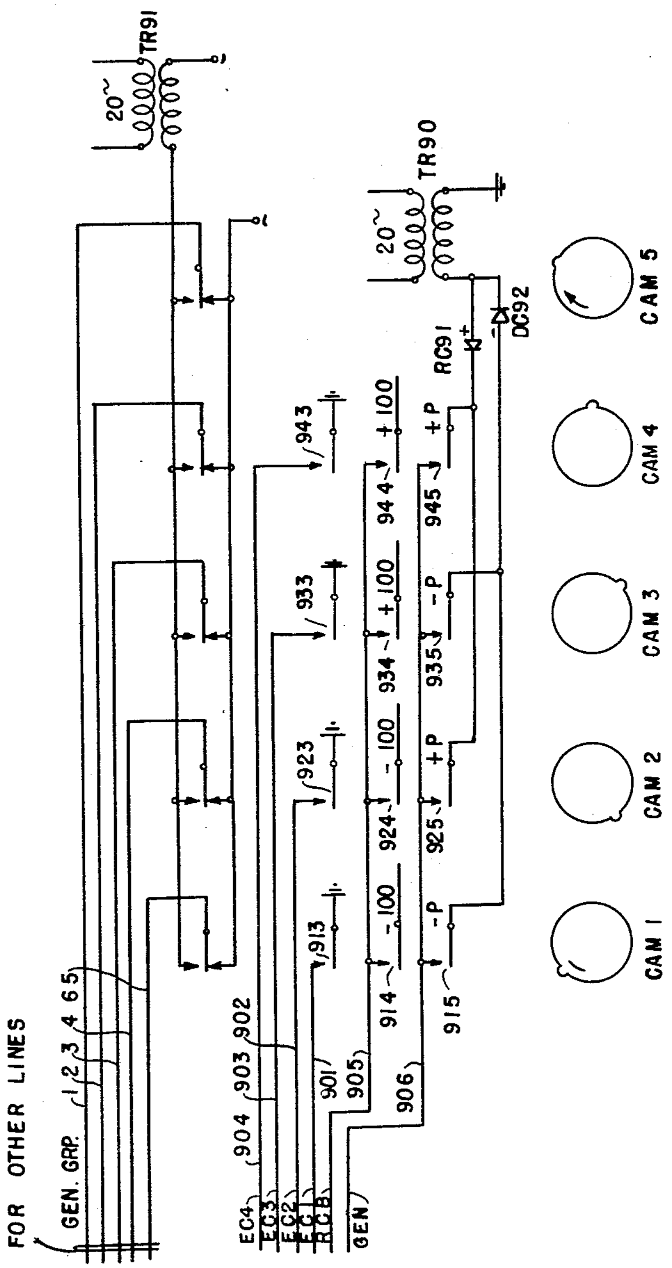

FIG. 9 shows the common ringing interrupter for use with the connector switches illustrated in FIGS. 1A, 8, and 12 and 13.

Figure 10:
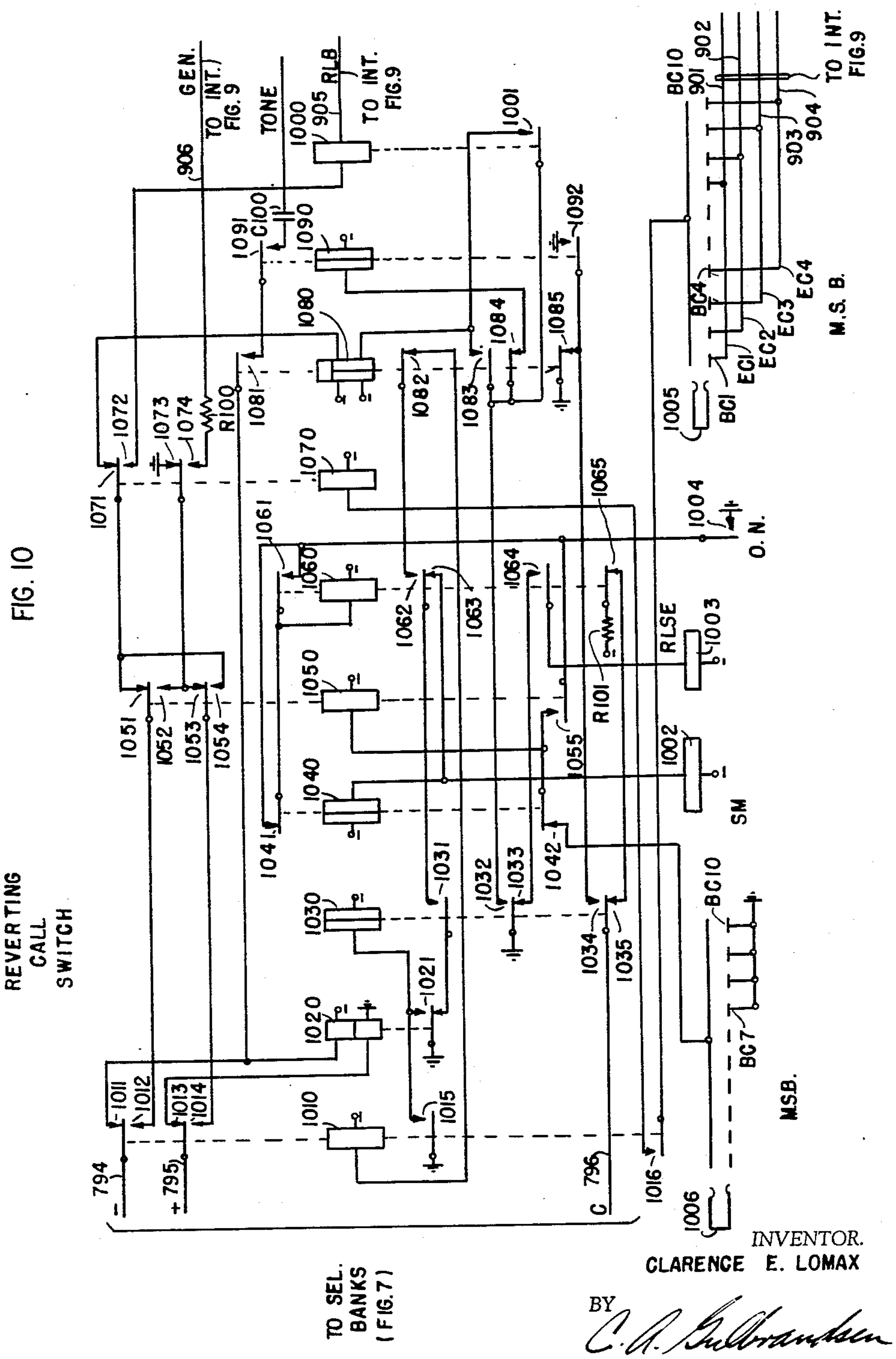

FIG. 10 shows an improved reverting call switch for use in the system illustrated in FIG. 1A.

Figure 11:
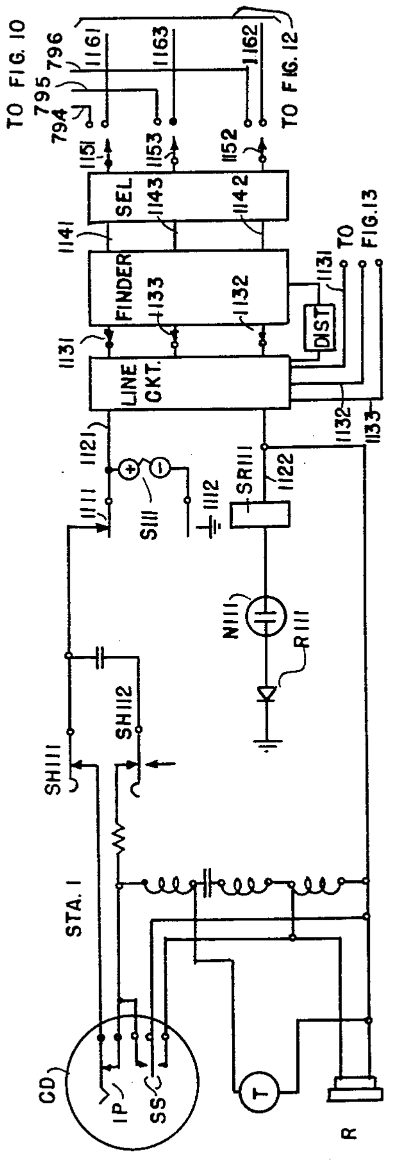

FIG. 11 shows a modification of one of the subscriber stations on a party line of the system illustrated in FIG. 1A, and also diagrammatically illustrates a well-known line circuit, finder and distributor, and selector switch.

Figure 11A:
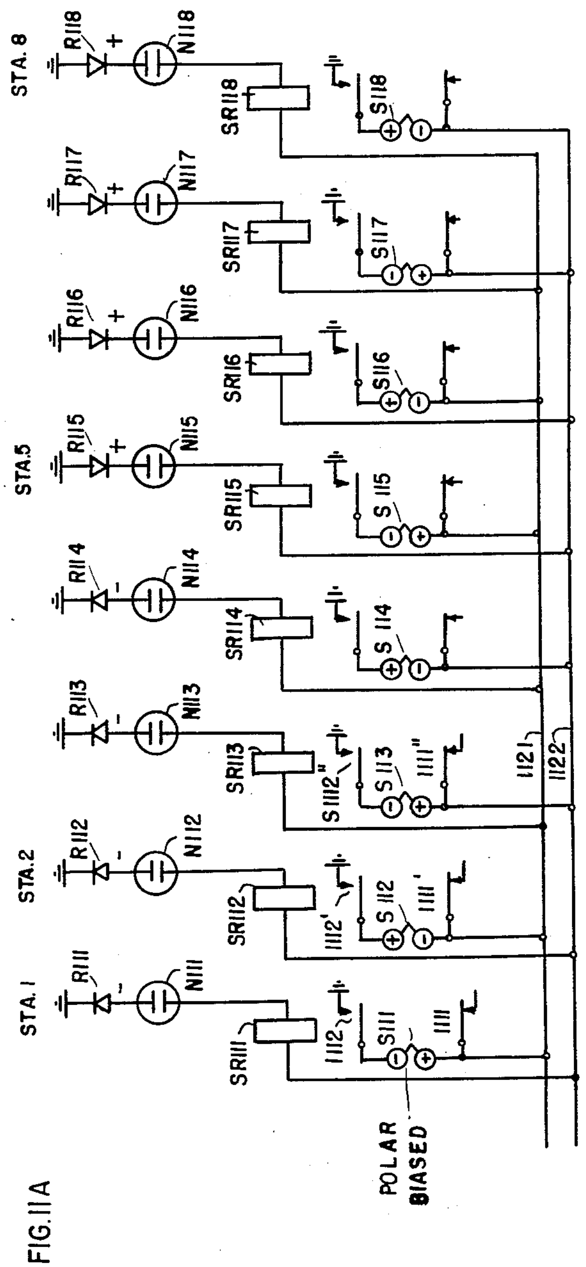

FIG. 11A diagrammatically illustrates the signaling apparatus of eight stations on one of the party lines, one of these stations being shown in FIG. 11.

Figure 12:
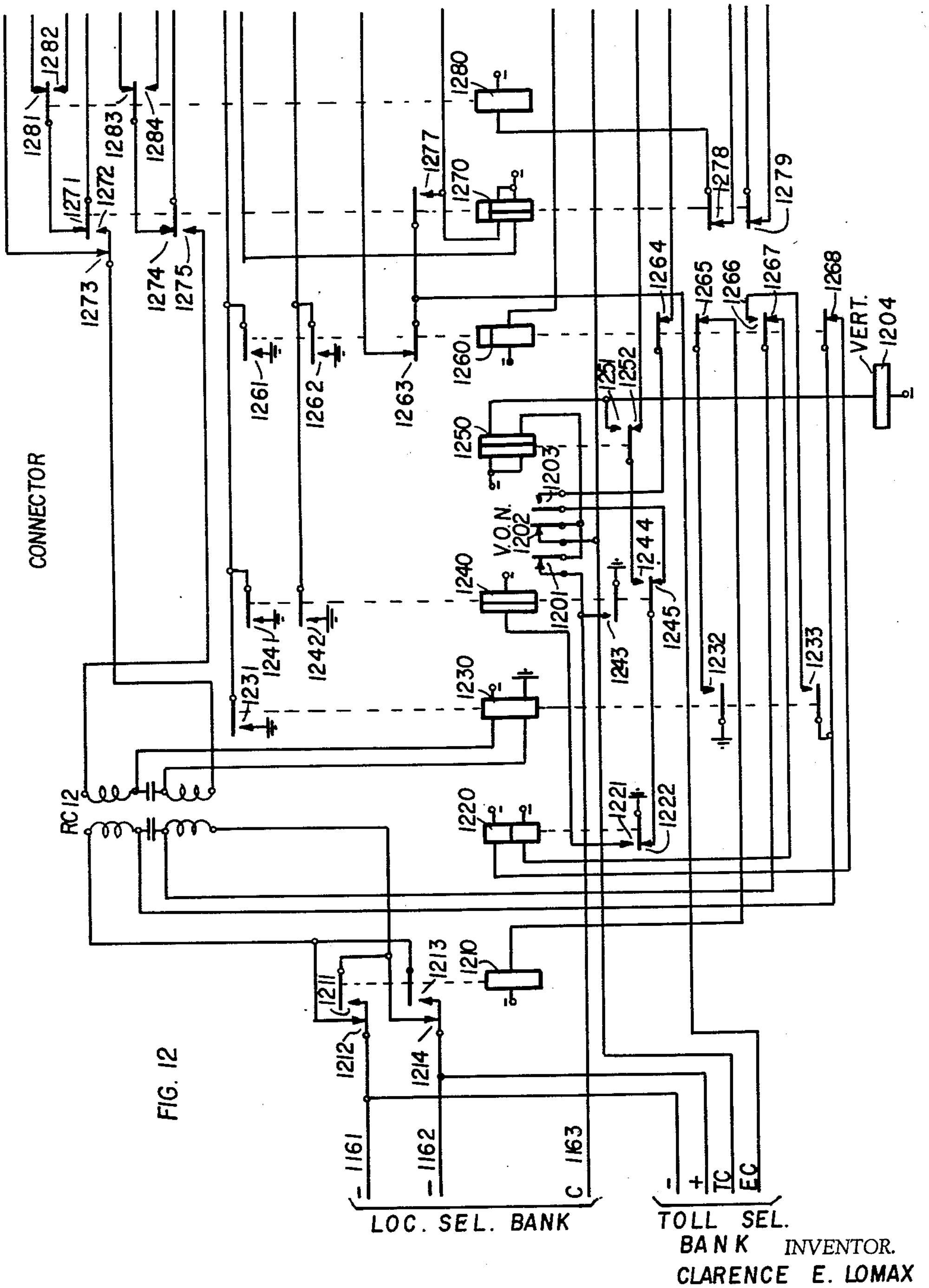

FIGS. 12 and 13 show the circuits of an improved connector switch for use in a selective party line ringing system of the terminal per line type.

Referring now in detail to the drawings, station 3, shown in FIG. 2, includes a well-known calling device CD having the usual impulsing springs, transmitter T, receiver R, induction coil 1C, and switch hook springs SH21, SH22, and SH23 which are shown operated by the removal of the handset from its cradle. Station 3 also shows a station relay SR3, one terminal of which is connected to line conductor 12 while the other terminal of the station relay is connected to the cold cathode gas filled tube T3 having the usual cathode C3, start anode SA3 and main anode MA3 connected as shown to ground at the station. Station 3 also shows a 20 cycle ringer S3 which has one terminal normally connected through the switch hook springs SH23 to the condenser C21 and then to the line conductor 11. The other terminal of the ringer extends to normally open contacts on the station relay SR3 and to ground at the substation when the station relay is operated to close its contacts. The cold cathode tube T3 is biased in the well-known manner so that it will fire only in response to negative potential of a predetermined voltage which, in this case, is a voltage higher than the voltage included in the transmission circuit. This high voltage is applied to the line conductor only during the ringing period and therefore tube T3 will conduct only during the ringing period and then only if negative potential of a given voltage, or higher, is applied to conductor 12. When tube T3 conducts a circuit is completed for operating the station relay SR3 which operates its contacts to connect ground to ringer S3 so that it may respond to ringing current of 20 cycles transmitted over line conductor 11.

As shown in FIG. 2A, each of the stations on this party line has a similar cold cathode tube and ringer. The tubes T1, T2, T5, T6, and T7 and their associated station relays SR1, SR2, SR5, SR6, and SR7 are connected to the negative line conductor 11, and tubes T1 and T2 are biased to respond to only the high voltage of negative polarity, while the tubes T5, T6, and T7 are biased to respond to only the high voltage of positive polarity. The tubes T3, T4, T8, T9, and T10 and their associated station relays SR3, SR4, SR8, SR9, and SR10 are connected to the positive line conductor 12. The tubes T3 and T4 are biased to respond to only the high voltage of negative polarity, while the tubes T8, T9, and T10 are biased to respond to only the high voltage of positive polarity. Only tubes T1 and T2 conduct when the high voltage of negative polarity is connected to line conductor 11 to operate their associated station relays SR1 and SR2 to connect ground to their associated ringers S1 and S2 to thereby prepare only two ringers on the party line for operation. Ringer S1 operates only in case 20 cycle ringing current is simultaneously applied to line conductor 12, while ringer S2 operates only in case 33 cycle ringing current is simultaneously applied to the line conductor 12. In a similar manner only tubes T5, T6, and T7 conduct when the high voltage of positive polarity is connected to line conductor 11 to operate the station relays SR5, SR6, and SR7 to connect ground to their associated ringers S5, S6, and S7 to thereby prepare only three ringers on the party line for operation. Ringer S5 operates only in case 20 cycle ringing current is applied to conductor 12, ringer S6 responds only to 33 cycle ringing current on conductor 12, and ringer S7 responds only to 42 cycle ringing current on conductor 12. The remaining tubes, station relays and the ringers are operated in a similar manner apparent from the foregoing description dependent upon the conductor over which the high voltage is applied and the frequency applied to the other conductor.

The improved connector switch shown in FIG. 3 is of the well-known Strowger type of vertical and rotary switch and has an individual set of bank contacts for each station on a party line, commonly known as a terminal, or jack, per station connector switch. This connector is accessible from the banks of the selector switch shown in FIGS. 1 and 2 and has access to the line circuits individual to groups of party lines of the terminal per station type.

The line conductors, such as conductors 11 and 12, of the party line terminate in ten sets of connector line bank contacts since there are ten parties on each party line. The line conductors for five of these sets of connector line bank contacts are connected in a straight multiple with the negative line conductor, such as conductor 11, connected to the upper or negative, connector line bank contacts while the positive line conductor, such as 12, is connected in multiple to the lower, or positive, connector line bank contacts in this set of five bank contacts. The remaining five sets of connector line bank contacts are also multipled to conductors 11 and 12 but have their line conductors connected to the remaining connector line bank contacts in a reverse order. That is, in the remaining five sets, the upper connector line bank contacts are connected to line conductor 12 while the lower connector line bank contacts are connected to line conductor 11. This reversal of the line conductors between the different sets of connected line bank contacts is necessary to selectively signal only one station on the party line as will be apparent from the following description. This type of reversal is old and well-known having been in commercial use in connection with connectors of the terminal per station type. This connector, and similar connectors, are connected, as shown, to the common ringing interrupter shown in FIG. 4.

The common ringing interrupter of FIG. 4 is divided into five ringing periods for distributing the ringing to different groups of connector switches and to the reverting call switches. These ringing periods are controlled by five cams, which at different timed intervals operate and close their associated contacts shown directly above each cam to transmit the high voltage of one or the opposite polarity for operating predetermined station relays in a selected party line and to simultaneously transmit a given frequency to selectively ring only one of the party line ringers prepared by the operated station relays.

The reverting call switches, one of which is shown in FIG. 5, are accessible from the reverting call level of the selector diagrammatically shown in FIGS. 1 and 2. Each reverting call switch includes the usual relays and a minor switch of the well-known type having a stepping magnet SM for operating the wipers 517 and 518 over their associated bank contacts. One level of these bank contacts are connected to the ringing interrupter of FIG. 4 for applying the so-called bi-lateral ringing to the party line.

FIG. 6 shows a party line substation having party line lockout controlled by relays and the transistor TR61. The battery and ground for controlling these relays are supplied from commercial current by means of a full wave rectifier in a well-known manner. This substation is also provided with a well-known cold cathode tube T61, a station relay SR61 and a ringer S61 for selectively signaling the called station. Tube T61 is biased, in a well-known manner, to respond only to negative potential and will fire only during the ringing period in response to a voltage higher than the usual transmission voltage used during talking. The ringer S61 is also biased in the well-known manner to respond to a ringing frequency of a predetermined polarity as indicated by the negative and positive symbols shown in the ringer coils. In this substation circuit the station relay SR61 is provided with normally open contacts which are closed during the ringing period to shunt the substation talking instrumentalities in order to protect such instrumentalities during the ringing period.

FIG. 6A shows only the ringing circuits of the eight parties on the same party line as the party shown in FIG. 6. The cold cathode tubes and station relays are shown connected to predetermined line conductors and the tubes are biased, as shown, to fire only in response to the high voltage of one or the opposite polarity to selectively operate only predetermined ones of the station relays during the ringing period to prepare the ringing circuit to their associated ringers dependent upon the conductor over which the high voltage is transmitted. The ringers are biased, as shown, so that only one of the prepared ringers will respond to the pulsating ringing current dependent upon the polarity thereof and the conductor transmitting the ringing current.

FIG. 7 shows the line circuit for the party line of FIGS. 6 and 6A and has relays for controlling the application of a high tone, above the audible range, to control the transistor in the substations of the party line to lock out all substations but the calling substation. The line circuit includes a time switch TS of the step-by-step type which controls cams for timing the duration of the lockout so that the lockout will be disabled after a predetermined time if conversation continues thereafter. FIG. 7 also shows a well-known vertical and rotary Strowger finder which is controlled through the distributor to find the calling line when a call is initiated thereon. A well-known vertical and rotary Strowger type selector is associated with the finder in the usual manner and this selector is provided with the well-known normal post springs NP which are closed when the selector is directively operated in a vertical direction opposite the level of bank contacts which have access to the reverting call switches. This selector has access to the reverting call switches of FIG. 10 over the reverting call level and has access to connector switches, one of which is shown in FIG. 8, over the remaining levels.

The improved connector switch of FIG. 8 is of the well-known vertical and rotary Strowger terminal per station type and has access to the line circuits of the party lines of the lock-out type shown in FIG. 7 and other types of lines (not shown). This connector is also accessible from the well-known vertical and rotary Strowger toll selector as shown in FIG. 1A. This connector and other similar connectors are connected to the common ringing interrupter shown in FIG. 9. This connector switch is provided with a time switch TS8 of the step-by-step cam operated type to connect the lockout tone to the called party line to lock out all parties but the called party and for disabling the lockout after a predetermined time if conversation continues beyond such time.

FIG. 9 shows the common ringing interrupter for use with connector switches of both the terminal per station and terminal per line type. This interrupter comprises five cams driven by a motor (not shown). Each vertical row of springs represents the springs operated by its respective cam and the cams divide the telephone exchange into five groups to ring only one group of lines at a time. The upper horizontal row of springs are used for ringing through other groups of connectors (not shown) while the lower numbered springs are used with the connectors of FIGS. 8 and 12–13 and with the reverting call switch of FIG. 10 for the so-called bi-lateral ringing method previously mentioned. The EC conductors are used to control the ringing period of the connectors in use, the RCB conductor is used to apply negative or positive high voltage to one or the other party line conductor to determine which substation relays are operated to prepare the ringer circuits at certain substations on the party line, while the GEN conductor is used to supply pulsating ringing current of one polarity or the opposite polarity to the other line conductor to operate only the desired one of the prepared ringers at the called substations.

The reverting call switch shown in FIG. 10 is similar to the reverting call switch shown in FIG. 5 and is for use in the system illustrated in FIG. 1A.

FIG. 11 shows another type of substation circuit for use with the so-called bi-lateral ringing method. In this substation the positive line conductor 1122 is connected in series with the station relay SR111, a neon tube N111, and rectifier R111 poled to pass negative polarity of a high voltage to ground. The station relay SR111, when operated, prepares the ringer S111 which is biased so that the ringer will respond only to pulsating ringing current of positive polarity. In addition the station relay SR111 opens the substation talking circuit during the ringing period to protect the talking apparatus. Fig. 11 also shows a well-known line circuit, line finder and selector switch commonly used in Strowger systems. This selector has access to the reverting call switches of FIG. 10 and to the terminal per line connectors, such as shown in FIGS. 12–13.

FIG. 11A shows the ringing apparatus of a party line having eight substations, one of which is the substation illustrated in FIG. 11. As shown, some of the station relays and their series connected neon tubes are connected to one line conductor while the remaining station relays and their series connected neon tubes are connected to the other line conductor. Each of these series connections include a rectifier, poled as shown, so that the neon tube will fire only from a high voltage of a predetermined polarity. The station relays when operated connect ground through their associated ringers, which are biased in the usual manner, to respond to pulsating ringing current of one or the opposite polarity. As will be noted, some of the ringers are connected to one line conductor while the remaining ringers are connected to the other line conductor. The ringer of any desired substation is selectively operated by the application of a high voltage of a selected polarity to one line conductor to fire only two of the neon tubes and operate two of the station relays to prepare the ringing circuit for only two ringers and by the simultaneous application of pulsating ringing current of a selected polarity to operate only one of the ringers which is biased to respond to such selected polarity of ringing current.

The improved connector of FIGS. 12–13 is of the vertical and rotary Strowger terminal per line type of connector and includes a well-known step-by-step minor switch for selecting the desired ringing combination for selectively ringing only the ringer at the desired substation on the connected party line. This connector is accessible over the local selector levels as well as over the toll selector levels as shown in FIG. 1A. This connector has access to regular lines and also to party lines such as shown in FIGS. 11 and 11A. The banks of the minor switch in this connector are connected over EC leads to the common ringing interrupter of FIG. 9 over which the ringing period and type of ring is determined. The high voltage ring control conductor RCB and the ringing current control conductor GEN are also connected to the common ringing interrupter.

*Local call*

Having given a general description of the invention, a detail description will first be given of the system shown in FIG. 1 involving the detail circuits shown in FIGS. 2, 3, 4, and 5. For this purpose it will first be assumed that subscriber A of FIG. 1 is the calling subscriber shown in FIG. 2. In response to the removal of the handset from the cradle, switch hook springs SH22 complete a loop circuit over line conductors 11 and 12 including the impulse springs IPS of the calling device CD to operate the line relay (not shown) in the line circuit. The operation of the line relay in a well-known manner causes the finder to find the calling line and connect such line to the associated selector. The seized selector now transmits dial tone to the calling subscriber in the usual manner after which the subscriber dials the digits of the called subscriber. The dialing of the first digit operates the selector opposite the vertical level corresponding to the first dialed digit after which the selector automatically rotates in the selected level to find an idle succeeding switch which may be another selector or a connector, depending upon the capacity of the system. Assuming only a thousand line system, then the selector is operated in the well-known manner to select an idle connector, which in this instance will be assumed to be the connector shown in FIG. 3. Line relay 320 is operated over contacts 311 and 313, and over line conductors 51 and 52, 31 and 32, 21 and 22, and 11 and 12 over the calling loop in the usual manner in response to the selector seizing the connector shown in FIG. 3. Contacts 321 close a circuit to operate slow-to-release relay 330. Contacts 332 close a circuit through vertical off-normal contacts V.O.N. 303 to operate slow-to-release relay 340. In response to dialing the next digit line relay 320 is intermittently restored and reoperated a number of times corresponding to the digit dialed. Each time line relay 320 restores a circuit is completed for operating the vertical magnet 308 as follows: ground, contacts 322, 334, and 341 to the vertical magnet and battery. A branch of this circuit is extended through the lower winding of series relay 340 to maintain relay 340 operated during dialing. The vertical magnet 308 operates the wipers in a vertical direction opposite the level dialed. The vertical off-normal contacts V.O.N. 303 open on the first vertical step to open the original operating circuit of relay 340 which, however, is maintained operated during dialing over its lower winding. After dialing the line relay remains operated and a short interval thereafter slow-to-release relay 340 restores to transfer the pulsing circuit to the rotary magnet 309 and rotary series relay 380.

In response to dialing the last, or ringing, digit, line relay 320 is again intermittently operated to operate the rotary magnet 309 to rotate the wipers in the selected vertical level to select the called substation on the party line terminating in the connector bank contacts shown opposite the wipers 301, 302, and 303. The circuit for operating rotary magnet 309 may be traced from ground, contacts 322, 334, 369, and 399 to magnet 309. A branch of this circuit may be traced through the slow-to-release rotary series relay 380. Relay 380 operates and at contacts 384 completes a circuit to the combined busy test and ring control relay 360.

In case the called party line is busy, then the CN terminal will be grounded by another connector engaging the called line, and relay 360 is operated over the following circuit before relay 380 restores: from grounded bank contact CN, C wiper 303, contacts 384 and 397, and relay 360 to battery. Relay 360 at contacts 368 prepares a locking circuit for itself and which is completed when relay 380 restores and closes contacts 383. Relay 360 connects busy tone to the calling subscriber from busy lead BUSY, condenser C33, contacts 393, 381, and 365, and through condenser C32 to the positive line conductor and back over the calling subscriber loop to the calling subscriber.

In case the called party line is idle, then the test bank contacts CN will be connected to battery through the winding of the cut-off relay (not shown) of the line circuit with the result that the busy relay does not operate. When relay 380 restores shortly after dialing the last digit, switching relay 390 is operated over the following circuit: ground, contacts 331, 367, relay 390, contacts 382, test wiper 303, test bank CN of the called line and through the cut-off relay (not shown) of the called line to battery. Contacts 391 and 392 prepare the circuits for operating the called substation ringer, contacts 393 opens a point in the busy tone circuit, contacts 394 prepares a circuit to transmit ring-back tone to the calling subscriber, contacts 395 grounds the test bank CN of the called line to busy this line to other connectors, contacts 396 prepares a circuit for the combined busy and ring control relay 360, contacts 398 completes the locking circuit of relay 390, contacts 399 opens the rotary pulsing circuit, and contacts 391′ opens a point in the release circuit to release magnet 323.

As previously mentioned, this connector is of the terminal per station type and therefore the last digit dialed corresponds to the called station on this particular party line, and, in addition, each substation, or party, on the party line has an individual EC bank contact accessible to the EC wiper 304 in the well-known manner.

Referring now to the common ringing interrupter of FIG. 4, cams 1, 2, 3, 4, and 5 are rotated by a motor (not shown) to sequentially close the contacts directly above such cams. It will be noted that the EC conductors, which correspond to the different parties on a party line, are respectively connected to contacts controlled by the respective cams. The cams provide five different ringing periods of one second intervals interspersed with five silent periods of about four second intervals. In addition, the ringing interrupter is divided into five groups of ring control leads which extend to different groups of connectors and to the reverting call switches so that the ringing load is reduced to a minimum for any ringing period. It will be noted that the connector of FIG. 3 is included in the third connector group and that the party extra control conductor EC1, or conductor 307, is connected to contacts 444 of the fourth ringing period. When cam 4 is operated to close its respective contacts, contacts, such as 441 and 444 and similar contacts, ground their connected EC conductors to control the ring control relays in the connectors and reverting call switches which at this time may be operated to engage such EC conductors. For example, the closure of contacts 444 grounds conductor EC1 of the third connector group, or conductor 307, to operate the combined busy and ring control relay 360 of the connector shown in FIG. 3. In addition cam 4 closes contacts, such as contacts 442 and 445, in each ringing group to transmit 100 volts of positive or negative polarity over the connected ring control conductors RCB of each group. For example, contacts 442 connect positive 100 volts to the RCB conductor 503 for the first group and contacts 445 connects negative 100 volts to the RCB conductor 306 of the third group. Also, cam 4 closes contacts, such as contacts 443 and 446, in each ringing group to transmit ringing current of a predetermined frequency over the ringing conductor GEN of each group. For example, contacts 443 connect 33 cycle ringing current to ringing conductor 502 for the first group and contacts 446 connect 20 cycle ringing current to ringing conductor 305 for the third group. In a similar manner the remaining cams close similar circuits in a manner apparent from the drawing for the remaining ringing periods.

Returning now to the operation of the connector and assuming now that the called substation is the substation C shown in FIG. 1 and further assuming that the called substation is similar to the substation shown in FIG. 2 and is on another party line similar to the party line indicated in FIG. 2A. Under this assumed condition the line wipers of the connector will be connected over the connector line bank contacts and through the line circuit to line conductors 11 and 12. During the fourth ringing period, the ringing interrupter grounds EC1 conductor 307 to operate relay 360 over EC wiper 304, contacts 365 and 396 after the connector has found the called line idle. Simultaneously with the operation of relay 360, contacts 445 of the ringing interrupter connects negative 100 volts to conductor 306 and through the winding of marginal relay 370, over contacts 364, 351, and 391 to wiper 301, over the upper connector line bank contacts of the called line through the line circuit of the called line to line conductor 12. Station relays SR3, SR4, SR8, SR9, and SR10 at substations 3, 4, 8, 9, and 10 are connected to line conductor 12 and these station relays are connected in series with their associated cold cathode tubes T3, T4, T8, T9, and T10, respectively. Tubes T8, T9, and T10 are biased in the well-known manner so that such tubes will fire only when positive 100 volt battery is connected to line conductor 12. Since tubes T8, T9, and T10 are biased in the positive direction no current will flow through station relays SR8, SR9, and SR10 with the result that such relays remain inoperative. Cold cathode tubes T3 and T4, however, are biased in the negative direction so that such tubes fire when negative 100 volt battery is connected to line conductor 12. The firing of tubes T3 and T4 set up a current flow through station relays SR3 and SR4 in series with connector relay 370 which is marginal due to the high resistance and impedance of the station relays. Station relays SR3 and SR4 operate in series with relays 370 when negative 100 volt battery is connected to line conductor 12. Relay 370, being marginal, will not operate. The operation of station relays SR3 and SR4 connect ground to their respective ringers S3 and S4 so that either one of these ringers may be operated dependent upon the frequency of the ringing current connected to line conductor 11. The remaining ringers on the party line cannot operate because their circuits are open at the contacts of their associated station relays.

The ringing interrupter at contacts 446 connects 20 cycle ringing current to the common generator ring lead 305 and a circuit may now be traced for operating the 20 cycle ringer S3 at the called substation as follows: from the 20 cycle source, FIG. 4, at contacts 446, GEN lead 305, resistance R31, contacts 362, 353, and 392, wiper 302, lower connector bank contact which is connected to line conductor 11 in this instance because the line conductors for this called substation require the reversal of the line conductors for ringing through the condenser C21, switchhook springs SH23, 20 cycle ringer R3, and contacts of station relay SR3 to ground. 20 cycle ringing current is also transmitted to station 4 but the ringer S4 at station 4 is responsive only to 33 cycle ringing current with the result that ringer S3 at the called station is the only ringer on this party line which responds.

The simultaneous application of negative 100 volts to conductor 306 at contacts 445 and 20 cycle ringing current to conductor 305, at the time ring control relay 360 is operated over EC1 conductor 307, causes station relays SR3 and SR4 to operate but 20 cycle ringer S3 alone operates in response to the 20 cycle ringing current. The other substation ringers, such as ringers S8, S9, and S10, do not operate because the circuits to these ringers have not been prepared by their associated station relays. Any desired substation ringer may be selectively operated dependent upon the operated position of the connector which selects the ringing period over the EC bank contact and wiper 304, and which selects the line conductor for transmitting the high voltage control for the station relays while it also selects the line conductor for transmitting the frequency of the ringing current dependent upon the selected ringing period.

It will be seen that when ringing current is applied to the negative line conductor 11, such ringing current passes through tubes T1, T2, T6, and T7 and their associated stations relays. One half of the cycle passes through two of these tubes and the other half cycle passes through the other two of these tubes. Such tubes may fire possibly at the peak of their half cycle but the associated station relays are of high impedance and no false ringing will take place, even if such station relays momentarily operate from ringing current, because no ringing current is applied to the other line conductor, or conductor 12.

The connector ring control relay 360 is intermittently operated by interrupter contacts 444 to selectively operate ringer S3 of the called substation as above described. The called subscriber may answer during the ringing period or between the ringing periods. It will first be assumed that the subscriber answers during the ringing period and in response to the removal of the handset from its cradle, the switchhook springs, such as SH22 at the called substation, completes a loop circuit through the substation circuit over line conductors 11 and 12 of the called substation, connector line bank contacts and wipers 301 and 302, contacts 391 and 392, 351 and 353, 364 and 362, over resistance R31 to GEN lead 305 and through relay 370 to the RCB ring control lead 306 to the ringing interrupter contacts 446 and 445. The 20 cycle ringing current source is a ground connected ringing source at contacts 446 to complete a circuit for operating relay 370 over the ring-cut-off loop circuit just traced to negative voltage at contacts 445. Relay 370, at contacts 371, completes a circuit for operating ring-cut-off relay 350 over its upper winding. Ring-cut-off relay 350 operates and at contacts 351 and 353 opens the ringing circuit while contacts 352 and 354 complete the talking circuit and a circuit for operating back-bridge relay 310 over the called station loop. At contacts 355, relay 350 completes a locking circuit for itself from grounded contacts 395, and at contacts 356 opens the circuit of relay 360. Relay 370 restores when the ringing circuit is opened at contacts 351. Relay 360 restores to open further points in the ringing circuit.

In case the called subscriber answers during the silent period at a time when relay 360 is restored, then the called substation loop is closed to operate ring-cut-off relay 350 from ground at contacts 361, 353 and 392, over the called station loop back to contacts 391, 351 and 363 to the lower winding of relay 350. Relay 350 operates to cut off the ring, to complete the circuit to back-bridge relay 310, and to complete the talking circuit as previously described. Back-bridge relay 310 operates to reverse battery back to the calling substation for supervisory purposes in the usual manner. The talking circuit between the calling and called stations is completed over the line conductors of the automatic switch train in the well-known manner.

After conversation and in response to the calling substation replacing the handset on the cradle, the switchhook springs open the calling loop to line relay 320. Relay 320 restores and opens the circuit to release relay 330. Relay 330 restores and at contacts 332 disconnects ground from conductor 53 to release the preceding switches in the well-known manner, and at contacts 333 opens the locking circuit of relay 390. Relay 390 restores and at contacts 395 removes the busy guarding ground from the called line, and at contacts 391′ completes the circuit for the release magnet 323. When the wipers of the connector are fully restored off normal springs O.N. 304 open the circuit to the releasing magnet.

*Reverting call*

It will now be assumed that station A (FIG. 1) wishes to call station B on the same party line as station A. As is usual practice in party line systems, the telephone directories advise each station on the party line how to make reverting calls to another station on his own party line. In this type of system the subscriber is instructed to dial one or more predetermined digit, or digits, and then dial a last digit corresponding to the desired called substation. The dialed digit, or digits, operate the switches in the automatic switch train to seize an idle reverting call switch in the well-known manner after which the last digit or the ringing digit, of the caller subscriber is dialed to operate the reverting call switch to select the proper ringing combination to selectively signal only the called subscriber.

In response to dialing the predetermined digit, or digits, designating a reverting call, the switch train is operated in the well-known manner to seize an idle reverting call switch. Assuming that the reverting call switch of FIG. 5 is the switch seized, then line relay 520 is operated over the calling loop. Contacts 521 completes an obvious circuit for operating slow-to-release relay 530. Relay 530 operates and at contacts 531 prepares a pulsing circuit to relay 540 and stepping magnet 523 of the associated minor switch. At contacts 532, relay 530 completes a circuit for operating slow-to-release relay 590, contacts 535 disconnects the idle battery marking potential through resistance R52 from the test conductor 63 while contacts 534 grounds conductor 63 to hold the preceding switches and to mark this reverting call switch busy to the selector switches.

In response to dialing the last or ringing digit, line relay 520 is restored and reoperated in accordance with the dialed digit to operate the minor switch to select the desired ringing period as well as the line conductors for transmitting the high voltage ring control and ringing current. Each time relay 520 restores relay 540 and stepping magnet 523 are operated over contacts 522, 531, and 563. The stepping magnet 523 advances the wipers 517 and 518 one step for each impulse. If the last digit comprises six or more impulses, wiper 517 completes a circuit for operating relay 550 shortly after dialing when relay 540 restores and closes contacts 542. Relay 550 operates and at contacts 551 and 554 reverses the ring control and ringing current leads with respect to the line conductors of the calling line. Contacts 550 complete a locking circuit for relay 550 from off-normal contacts O.N. 157′ which closed on the first step of the minor switch. Relay 560 is also operated by off-normal contacts O.N. 517′ by way of contacts 541 and completes a locking circuit for itself at contacts 561. At contacts 563 relay 560 opens the pulsing circuit and at contacts 562 prepares a circuit for relay 510.

Wiper 518 of the minor switch selects the desired ringing period over the associated EC conductors, and assuming that the called substation B corresponds to station 4 of FIG. 1A, then negative 100 volts is required on line conductor 12 for operating station relay S4 and 33 cycle ringing current is required on line conductor 11 for selectively operating only ringer S4 at the called substation. The EC conductors from the reverting call switch terminate in the upper horizontal row of the ringing interrupter and the third ringing period, comprising contacts 431, 432, and 433, is used in response to wiper 518 stopping in engagement with the eighth bank contact connected to the EC3 conductor 506.

After dialing the ring digit, the calling subscriber replaces his handset thereby opening the calling loop to restore line relay 520. At contacts 522, relay 520 completes a circuit for operating relay 510 by way of contacts 531, 562, and 582. Relay 510 operates and contacts 516 close a circuit for slow-to-release relay 530 to maintain it operated. Relay 510, at contacts 511, prepares a circuit for the ring control relay 570, and at contacts 513 and 515 prepares the ringing circuits for ringing back on the party line.

During the third ringing period interrupter contacts 431 grounds EC3 conductor 506 to operate ring control relay 570 by way of the eighth bank contact, wiper 518 and contacts 511. Relay 570 at contacts 572 connects negative 100 volts at contacts 432 over the RCB ring control conductor 503 and marginal relay 500, contacts 572, 554, and 515 to conductor 62 and then back over selector bank contact 42, conductor 32, finder wiper 22 and bank contact, to conductor 12 (FIG. 1A) of the called party line. In a manner similar to that previously described, the high voltage of negative polarity connected to line conductor 12 causes only tubes T3 and T4 to fire and operate their associated station relays SR3 and SR4 because tubes T3 and T4 are biased in the well-known manner to fire only in response to a high voltage of negative potential of 100 volts or higher. Tubes T8, T9, and T10 are biased in a positive direction and do not fire when negative 100 volts is connected to conductor 12. Station relays SR3 and SR4 both operate to ground their associated ringers S3 and S4. The third ringing period at interrupter contacts 433 connects 33 cycle ringing current, simultaneously with the closing of contacts 431 and 432, to the GEN ringing conductor 502, over resistance R51, contacts 574, 552, and 513 to conductor 61, and by way of selector bank contact and wiper 41, conductor 31, finder wiper and bank contact through the line circuit to line conductor 11 of the party line. The 33 cycle ringing current connected to line conductor 11 is transmitted through the condenser and closed switchhook springs of the called substation 4, and ringer S4 to ground at the operated contacts of the station relay SR4 to selectively operate only ringer S4. Even though relay SR4 has prepared the circuit for ringer S3 it will not respond to 33 cycle since it is tuned to respond only to 20 cycle ringing current.

The called subscriber may answer the call either during the ringing period or during the silent period. Assuming first that the party answers during the ringing period, then marginal relay 500 is operated over the answering loop from grounded 33 cycle generator at contacts 433 over the previously traced ringing circuit to line conductor 11, and now through the closed switchhook springs similar to springs SH22, impulse springs 1PS of the calling device and the substation circuit to conductor 12 and back to the previously traced ring control circuit to negative 100 volt battery at contacts 432. Marginal relay 500 did not previously operate because of the high impedance and resistance of the station relays. Relay 500, at contacts 501, completes a circuit from grounded contacts 532 for operating ring-cut-off relay 580 over its lower winding. Relay 580 operates and contacts 581 prepare a circuit for connecting reverting call tone to the answering subscriber, at contacts 582 opens the circuit to relay 510, at contacts 583 completes a locking circuit for relay 580 independent of contacts 501, and at contacts 584 opens the circuit to the slow-to-release relay 590. Relay 510 contacts 591.

When the calling subscriber removes his handset after a time interval sufficiently long to properly signal the called substation, the subscribers may then start conversation. Talking battery is furnished to both the calling and called parties through the windings of line relay 520.

After conversation and in response to both parties replacing their handsets line relay 520 restores and at contacts 521 opens the circuit to release relay 530. Relay 530 restores after an interval to open the locking circuit of relay 580 at contacts 532. Contacts 534 disconnects ground from conductor 63 to release the preceding switches, and contacts 533 complete the circuit to release magnet 524 by way of contacts 564. Release magnet 524 restores the wipers 517 and 518 to their normal positions and off-normal contacts O.N. 517' open the locking circuit of relay 560 when the wipers are fully restored. Relay 560 restores and opens the circuit to release magnet 524 at contacts 564, and at contacts 565 connects idle marking battery through resistance R52, contacts 592 and 535 to the C test conductor 63 to mark this reverting call switch idle and selectable for further use.

In case the called party answered between ringing periods, or during the silent period, then ring-cut-off relay 580 alone is operated to cut off the ring. During the silent period relay 570 is in restored position and if the called party responds at this time a circuit is completed from ground, contacts 573, 552, and 513, to conductor 61 and over the line loop back to conductor 62, contacts 515, 554 and 571 to the upper winding of ring-cut-off relay 580. Relay 580 operates and performs the same functions as previously described.

In case the last ringing digit is less than six then wiper 517 engages dead contacts with the result that ring reversing relay 550 is not operated and therefore the ring control and generator leads are not reversed with respect to the party line conductors. Under this condition the high voltage 100 battery of either negative or positive potential is connected to line conductor 11 instead of line conductor 12 and the selected ringing frequency is connected to conductor 12 instead of line conductor 11. The tubes T1, T2 are biased to respond only to the high voltage of negative polarity while tubes T5, T6, and T7 are biased to respond only to the high voltage of positive polarity on line conductor 11 to cause operation of their associated station relays which in turn ground their associated ringers. In case negative high voltage is connected to conductor 11 tubes T1 and T2 and their respective station relays SR1 and SR2 operate to ground the respective ringers S1 and S2. Only one of the ringers, however, is operated dependent upon the frequency of the ringing current connected to line conductor 12. In case positive high voltage is connected to conductor 11 then tubes T5, T6, and T7 fire to cause their respective station relays SR5, SR6, and SR7 to operate and ground their respective ringers S5, S6, and S7. Only one of these ringers is operated dependent upon the frequency of the ringing current connected to line conductor 12. The selection of the ringing period is controlled over the EC conductors dependent upon the bank contacts selected by wiper 518, and the reversing of the ring control lead and the ringing lead with respect to the party line conductors is controlled by wiper 517, and the selected ringing period determines the polarity of the high voltage and the ringing frequency so that any party on the party line may be selectively signaled in a manner apparent from the foregoing description.

*Call from station D to station F*

The system shown in the upper portion of FIG. 1A is somewhat similar to that described for FIGS. 1, 2, 3, 4, and 5, except that the party lines are provided with line lockout for a predetermined time interval and have modified ringing control arrangements for selectively signaling any one of eight parties on a party line. The party line lockout provides secret service, or party line lock-out for only a predetermined time after which any other subscriber on the party line may listen in on the conversation if he so desires. In addition, just before the lock-out arrangement is to be disabled, a tone is transmitted over the line to advise the connected subscriber that any party on the line can thereafter listen in if the conversation is continued. It is believed that this secret service for only a predetermined time may shorten long conversations on party lines. FIGS. 6, 6A, 7, 8, 9, and 10 will now be used to describe a call from station D to station F.

In response to station D removing his handset, switchhook contacts SH64 open and switchhook contacts SH61, SH62, and SH63 close as shown in FIG. 6, while at all non-calling stations on this party line the switchhook contacts SH64 remain closed. The closure of switchhook contacts SH61 completes the calling loop for operating line relay 760 of the line circuit from ground through the upper winding of relay 760, contacts 752, resistance R71 and right-hand winding of electro-polarized shunt field relay 710 in multiple, conductor 602, contacts 644, transmitter T, upper winding of induction coil IC, impulse springs IPS, contacts SH61 and 641, line conductor 601, contacts 751 and lower winding of relay 760 to battery. At contacts 761, relay 760 connects marking battery through the winding of cut-off relay 750 to the C finder bank contact 773 to mark the calling line in the finder banks. At contacts 763, relay 760 grounds the CN connector lead 884 to busy the called line. At contacts 764 completes a circuit for operating slow-to-release relay 740, and at contacts 765 grounds the distributor start conductor ST to cause the finder to operate and find the marked calling line in the well-known manner. Relay 740 operates and prepares a circuit for slow-to-release relay 730. When the finder finds the calling line, line cut-off relay 750 is operated from ground (not shown) in the finder, wiper 778, and contacts 761 and 733. Contacts 751 and 752 of relay 750 open the loop circuit to line relay 760, contacts 753 close a holding circuit for relay 750, and contacts 754 operate slow-to-release relay 730 by way of contacts 741. Line relay 760 restores and at contacts 762 substitutes the ground fed back from the switch train for maintaining conductor 884 grounded. At contacts 764, relay 760 opens the circuit to relay 740 and at contacts 765 disconnects ground from the start conductor ST.

Slow-to-release relay 730 operates and closes a locking circuit for itself including contacts 734 and 754 before contacts 741 open. At contacts 737, relay 730 completes a circuit through the left-hand winding of shunt field relay 710 to polarized relay 710 so that it will respond to a reversal of current over the line conductors when the called party answers. At contacts 731 and 732, relay 730 connects to a 6000 cycle tone through condensers C71 and C72, 721 and 722 in simplex of the line conductors 601 and 602 and through condensers C62, C63, and C64 to the transistor network including the transistor TR61 to operate lockout relay LO1. The transistor network comprises a tuned filter TF6 connected to the base of transistor TR61 while the emitter is grounded. A variable resistor R61 is connected between the condenser 64 and filter TF6 to increase the sensitivity of the circuit. Relay LO1 and condenser C65 are connected to transistor TR61 and is operated when the proper signaling current is received and amplified by the transistor, the condenser C65 building up a charge during signal transmission to assist in holding relay LO1 operated during the half-cycles of the signaling frequency. The battery and ground connections for the lockout relays at each substation are supplied by the well-known full wave rectifier arrangement which is connected to the commercial current source at each of the substations.

In response to the transmission of the 6000 cycle tone to the calling line all relays LO1 at each substation on the calling line are operated. At the calling substation relay LO1 completes a circuit for operating relay LO2 over the following circuit: ground, contacts 621, switchhook contacts SH63 which are closed at only the calling station, contacts 642 and relay LO2 to battery. At the non-calling substations on this line the operation of relays LO1 completes circuits for operating their LO3 relays as follows: ground at the contacts of their operated LO1 relays, such as contact 621, normally closed switchhook contacts, such as contacts SH64, contacts similar to contacts 632, and through their LO3 relays to battery. The operated LO3 relays at the non-calling substations at their contacts, similar to contacts 641 and 644, open the circuit to the substation circuit; at contacts, such as contacts 642 open the circuit to their associated LO2 relays to prevent the operation of such LO2 relays in case such non-calling subscribers may remove their handset and close switchhook contacts similar to contacts SH63; and at contacts, similar to contacts 643, close locking circuits for their LO3 relays from grounded contacts similar to contacts 621. All non-calling substations having their LO3 relays locked up are now disconnected from line conductors 601 and 602 to lock out such substations. The relays LO3 remain operated until the tone is removed from the line conductors.

At the calling substation relay LO2 is operated and at contacts 631 completes a locking circuit for itself from contacts 621. At contacts 632 relay LO2 opens the circuit to relay LO3 to prevent the operation of relay LO3 in case the switchhook springs SH64 should be momentarily closed. From the foregoing it will be seen that in response to the transmission of the tone from the line circuit back over the party line all of the non-calling substations have their talking circuits opened at contacts, similar to contacts 641 and 644, while only the calling substation is operatively connected to line conductors 601 and 602.

As soon as the finder found the calling line and switched through, the calling loop is extended to the selector switch and dial tone is transmtited to the calling substation in the well-known manner. The calling substation now operates his calling device in accordance with the digits of the called subscriber to operate one or more selectors, dependent upon the capacity of the system, to seize an idle connector switch having access to the called line in the well-known manner.

Assuming now that the connector of FIG. 8 is seized over the selector wipers 781 to 783 and conductors 791, 792, and 793 and in response to such seizure vertical series relay 840 and line relay 820 are operated. Relay 840 is operated from ground at the selector switch, over wiper 783 and conductor 793, vertical off normal contacts V.O.N. 817 and upper winding of relay 840. The line relay 820 is operated over the calling substation loop including line conductors 601 and 602, finder wipers 775 and 776, contacts 701 and 702, selector wipers 781 and 782, conductors 791 and 792, contacts 851 and 854, contacts 812 and 814, upper and lower windings of line relay 820 to battery and ground.

Relay 840, at contacts 841, prepares a circuit to the vertical magnet 828. Relay 820 completes a circuit for operating slow-to-release relay 830 at contacts 821. Relay 830 operates and contacts 833 grounds conductor 793 to hold the preceding switches and to mark this connector busy. Grounded contacts 833 hold relay 840 operated through vertical off-normal contacts 817 and also grounds the toll test lead TC by way of V.O.N. 818 to mark this connector busy to toll selectors.

The next digit dialed by the calling subscriber intermittently restores and reoperates line relay 820 in accordance with the dialed digit. Each time line relay 820 restores contacts 822 complete a circuit for operating vertical magnet 828 in multiple with the lower winding of relay 818. Vertical magnet 828 steps the connector wipers one vertical step for each impulse of the dialed digit opposite the level containing the called line, while slow-to-release relay is maintained operated over its lower winding when the vertical off-normal springs 817 open on the first vertical step.

Relay 840 restores, shortly after termination of dialing, to transfer the pulsing circuit to the rotary magnet at contacts 842. In response to the last, or ring selecting digit, line relay 820 is operated to cause rotary magnet 829 to rotate the wipers to the connector bank contacts correspond'ng to the called substation over the pulsing circuit including contacts 822, 834, 842, 879, and 801'. Rotary series relay 890 is operated in multiple with the rotary magnet to prepare a circuit for the combined busy and ring control relay 870 at contacts 892. After dialing and before the slow-to-release relay 890 restores the connector tests for an idle or busy condition on the called line.

In case the called line is busy, the connector test conductor 884 will be grounded and a circuit is completed for operating relay 870 by way of test wiper 826, contacts 892 and 808. Relay 870, at contacts 873 transmits busy tone to the calling subscriber by way of the busy tone source Busy Tone and associated condenser, contacts 857, 803, 873, and 856 and through the condenser C82 and contacts 854 to line conductor 792 and back to the calling subscriber. When relay 890 restores, after an interval, relay 870 is locked in operated position by way of contacts 832, 877, 893, and 808. In response to the receipt of busy tone, the calling subscriber will hang up to cause the release of the switch train in a manner to be described hereinafter.

In case the called line is idle, then battery through the winding of the cut-off relay of the called line circuit will be connected to conductor 884, with the result that relay 870 does not operate. When relay 890 restores a circuit is completed for operating switching relay 700 as follows: ground, contacts 832, 876, upper winding of relay 800, contacts 891, wiper 826, and conductor 884 of the called line; and assuming for the time being that the line circuit of FIG. 7 is the called line circuit, the circuit continues over a contact, such as contact 762 and winding of the cut-off relay, such as relay 750, to battery. The cut-off relay operates to open the circuit to the associated line relay and to extend ground to the finder line bank contact, such as 773, to busy the called line in the finder banks. Switching relay 800 is operated over the above traced circuit to close its X contacts 805 to completely operate relay 800 from ground contacts 831 and 805, lower high resistance winding of relay 800, and through the winding of relay 890 and magnet 829 to battery. Due to the high resistance of the lower winding of relay 800 relay 890 and magnet 829 will not operate in series therewith. At contacts 801 and 802, relay 800 connects the connector to the line conductors 882 and 883 of the called line by way of wipers 824 and 825 to prepare the ringing and talking circuits. Contacts 806 grounds conductor 884 by way of wiper 826 to mark the called line busy to other connectors and to the line finders through the operated contacts of the called line cut-off relay. Contacts 807 connects the combined busy and ring-control relay 870 to the EC wiper 827 to prepare the ringing circuits and contacts 802' opens a point in the circuit for the release magnet 836. The connector is now in condition to ring the called party and when the ringing interrupter cam 1 of FIG. 9 closes its contacts 913, 914, and 915 on the first ringing period the called party is selectively signaled.

During the first ringing period contacts 913 grounds the EC1 conductor 901 to operate relay 870 by way of EC wiper 827 and contacts 866 and 807. At contacts 875 relay 870 connects negative 100 volts battery at contacts 914 by way of RCB conductor 905, winding of marginal relay 880, contacts 875, 861, and 801, wiper 824, negative conductor 882 of the called line similar to the negative line conductor 601. At the same time interrupter contacts 915 connect negative pulsating ringing current, derived from the 20 cycle source through transformer TR90 and from ground through the lower winding of transformer TR90, rectifier RC92 which passes the negative half-cycles, the GEN conductor 906, to the positive line conductor 883 of the called line by way of resistor R81, contacts 872, 863, and 802, and wiper 825.

Referring now to FIG. 6A and assuming that the line conductors 601 and 602 are the line conductors of the called line, then the connection of the high voltage of 100 volts negative polarity to the negative line conductor 601 will cause the cold cathode tubes T63 and T64 to fire, because of their negative bias, and permit current to flow to operate station relays SR63 and SR64. Cold cathode tubes T67 and T68 are also connected to line conductor 601 but these tubes are biased in a positive direction and will not fire when negative high potential is connected to conductor 601. Since tubes T67 and T68 do not fire then relays SR67 and SR68 are not operated.

Relays SR63 and SR64 both operate and connect ground to their associated ringers S63 and S64 which are connected to the positive line conductor 602. However, it will be seen that ringer S64 is biased in a positive direction so that it will not respond to the pulsating ringing current of negative polarity. Ringer S63, being biased in a negative direction, responds to the pulsating ringing current of negative polarity to selectively signal the called substation on the party line.

In addition to grounding ringer S63, relay SR63 closes contacts 612' to short out the transmitter at the called substation to prevent the high voltage from damaging the transmitter in case the called substation should answer during the ringing period, as may be seen in FIG. 6 wherein contact 612 of relay SR61 shorts transmitter T.

Other substations on the party line are selectively signaled in a similar manner when the connector is operated to engage the connector bank contacts individual to such substations. For example, if another substation on the party line is called having the same ringing period as the one just described, then the line conductors are reversed in the line connector bank contacts with the result that contacts 914 connect negative 100 volts to line conductor 602 instead of conductor 601, while contacts 915 connect negative pulsating ringing current to conductor 601 instead of conductor 602. Under this condition, tubes T61 and T62 which are biased in the negative direction fire and cause station relays SR61 and SR62 to operate and ground their respective ringers S61 and S62 and only ringer S61 responds to the pulsating ringing current of negative polarity connected to line conductor 601, since ringer S61 is biased in the negative direction while ringer S62 is biased in the positive direction. Tubes T65 and T66 are biased in a positive direction and therefore do not fire when the negative high voltage is connected to conductor 602, with the result that station relays SR65 and SR66 do not operate to ground their associated ringers. In a manner similar to that just described any substation may be selectively rung dependent upon the set of bank contacts engaged by the operated connector.

The connector ring control relay 870 is intermittently operated by interrupter contacts 913 to selectively operate ringer S63 of the called substation as above described. The called subscriber may answer during the ringing period or during the silent period, or non-ringing, period. Assuming that the subscriber answers during the ringing period, then relay 880 is operated over the called substation loop including the switchhook springs, such as springs SH61, and impulse springs of the substation calling device, line conductors, such as conductors 601 and 602 of the called party line, conductors 882 and 883, wipers 824 and 825, contacts 861 and 863, 872 and 875, resistor R81 and relay 880, GEN conductor 906 and RCB conductor 905, contacts 914, to negative 100 volt battery and contacts 915 over rectifier RC92 and lower winding of transformer TR90 to ground. Relay 880 operates over the called loop when the party answers and at contacts 881 operates ring cut-off relay 860. Relay 860 locks to ground by way of contacts 865, 852', 803', and 806; at contacts 861 and 862 opens the ring control and ring circuit, and at contacts 862 and 864 connects the called substation loop to back bridge relay 810 by way of contacts 853 and 856.

Relay 810 operates over the called loop and at contacts 811 connects a multiple ground to relay 800 to thereby hold the connector operated until both subscribers release. At contacts 812–815 reverses battery back over the calling loop for supervisory purposes and to operate shunt field relay 710, and at contacts 816 completes a circuit for operating the time switch motor magnet 837. The circuit for operating magnet 837 may be traced from the time pulse conductor which is intermittently grounded at predetermined time intervals, contacts 867 and 816, cam contact 845 and magnet 837 to battery. Magnet 837 operates cams 1, 2, 3, and 4 one step for each ground pulse received over the time pulse lead. On the first step of the cams, cam 3 causes cam springs 847 to close and cam springs 846 to open. Springs 847 close to prepare a restoring circuit for restoring the cams to their normal positions. Also in response to the first step of cam 1, cam springs 843 and 844 close to connect 6000 cycle tone through condensers C83 and C84 in simplex of the talking conductors to cause the transistors, such as transistor TR61, associated with the substations on the called party line to operate their associated lockout relays, such as relay LO1. Assuming that the called substation shown in FIG. 6 is the substation of the called party, then the simplex circuit for operating the transistors at all substations may be traced as follows: from the high frequency tone source of 6000 cycles, condensers C83 and C84, contacts 843 and 844, conductors 791 and 792, contacts 851 and 854, condensers C81 and C82, contacts 853 and 856, 862 and 864, 801 and 802, wipers 824 and 825, conductors 882 and 883 of the called party line which in this instance are assumed to be line conductors 601 and 602, to condensers, such as condensers C62 and C63, to condenser C64 and the transistor networks TF6 and TR61. In the well-known manner this tone is amplified by the transistors to operate their associated lockout relays, such as relays LO1 at all substations on the called party line. At the called substation the switchhook springs, such as springs SH63, are closed with the result that lockout relay LO2 at the called substation is operated by way of contacts 621, SH63, and 642. At all the other non-called substations on the called party line the switchhook springs SH64 are closed with the result that lockout relays, such as relays LO3, are operated by way of contacts 621, SH64, and 632. Lockout relay LO2 at the called substation locks itself by way of contacts 621 and 631 and at contacts 632 opens the circuit to its associated lockout relay LO3 to prevent operation of relay LO3 due to momentary operation of the switchhook contacts. The lockout relays, such as relays LO3, at all non-answering substations complete locking circuits by way of contacts 621 and 643 and at contacts 642 opens the circuits to their associated LO2 lockout relays to prevent their operations by subsequent operations of the switchhook springs. The operated lockout relays, such as LO3, at all non-answering substations, operate their contacts 641 and 642 to open the talking circuit to the line conductors of the called line to thereby provide secret service to the called substation since the called substation is the only substation at this time operatively connected to the talking conductors of the called party line.

When the called substation answered it will be remembered that connector line relay 810 operated and reversed battery back toward the calling line to operate shunt field relay 710 by reversing the current through the right-hand winding. At contacts 711, relay 710 prepares a circuit for operating motor magnet 715 of time switch TS each time the time pulse lead is grounded. Time switch TS and time switch TS8 now operate in synchronism because they are operated from the same pulse lead.

The time switch TS8 is operated step by step by the ground pulses on the time pulse lead and after a predetermined time cam 4 closes contacts 848 to momentarily connect an audible warning tone to the positive line conductor 792 to advise both the calling and called substations that secret service is about to be disabled and that if conversation continues thereafter any substation on the calling or called party lines may listen in on the continued conversation. When the time switch motor magnet 837 is operated from the grounded time pulse lead near the end of the predetermined time period, contacts 839 connect the warning tone through contacts 848 to line conductor 792 and by way of contacts 854, condenser C82, contacts 856, 864, and 802, wiper 825 to line positive line conductor 883 of the called party line, and to the calling party line by way of selector wiper 782, contacts 702, wiper 776, bank contact 772, R71 and right-hand winding of shunt field relay 710 in multiple, to the positive line conductor 602, of the calling substation. The tone is heard by both the calling and called parties until magnet 837 restores in response to the disconnection of ground from the time pulse lead. On the next grounding of the time pulse lead, cam springs 848 open to disconnect the audible warning tone, cam springs 843 and 844 disconnect the high frequency in audible tone from in simplex of line conductors 791 and 792. In a similar manner the time switch TS is operated step by step by means of the ground pulses on the common time pulse lead operating motor magnet 715 by way of contacts 739, 711, and 743. Both time switches TS8 and TS operate in unison and cam 3 of time switch TS closes contacts 745, substantially simultaneously with contacts 848 of time switch TS8, to connect the audible warning tone to the positive line conductor 602 by way of contacts 717 when magnet 715 operates to close contacts 745. This tone is audible to both called subscribers and is the same tone source for both time switches and warns both subscribers that secret service is about to be discontinued. On the next grounding of the time pulse lead, cam springs 742 close to operate relay 720 from grounded test lead 884 which, in the usual manner, is connected through the operated switch train to ground at contacts 833 of the connector. Relay 720, at contacts 724 locks itself to grounded conductor 884, at contacts 723 shorts the righthand winding of relay 710, and at contacts 721 and 722 disconnects the high frequency tone from the line conductors. When the high frequency tone is disconnected at both timing switches, relays LO1 at all substations on the called and calling lines restore. At the calling and called substations relays LO2 restore when their locking circuits are opened and relays LO3 at the other substations restore to connect the line conductors of all non-calling and non-answering substations to their line conductors thereby enabling any substation on either the called or the calling line to listen in on the conversation. The time switch TS, associated with the line circuit of the calling party line, is provided to enable lockout, or secret service, for such party line when calling a single party line, or any called line of the system not necessarily provided with lock-out. The time switch TS8, associated with the party line connector of FIG. 8, is provided to enable lockout, or secret service, to the called substations on the party lines accessible to such connector from any type of calling line in the system. While only one time switch is needed in a call from a party line provided with such lockout to a called party line also provided with lockout, the two connected time switches do not cause any interference.

When the time pulse lead is again grounded magnet 715 of time switch TS and magnet 837 of time switch TS8 again step their associated cams. In time switch TS, cam 1 at contacts 743 opens the time pulse stepping circuit to magnet 715 and at contacts 742 opens the original circuit to relay 720 which is now locked operated to grounded conductor 884, while contacts 745 open the warning tone circuit. In time switch TS8, cam 2 opens the time pulse stepping circuit to magnet 837 at contacts 845, while cam 4 at contacts 848 opens the warning tone circuit. The time switches TS and TS8 remain in this position until the connection is released.

After conversation and in response to the calling party replacing his handset the calling loop to line relay 820 is opened and relay 820 restores to open the circuit to slow-to-release relay 820 at contacts 821, while contacts 822 prepare circuits for operating the release magnet 836 and for restoring time switch TS8. After an interval relay 830 restores to disconnect one of the ground connections at contacts 831 from the locking circuits of relay 800, at contacts 835 prepares further points in the releasing circuits, and at contacts 833 disconnects ground from the C conductor 793 to release the preceding selector and finder switches and relays 750 and 720 in the calling line circuit. Relay 750 restores before relay 720 and at contacts 754 opens the locking circuit of slow-to-release relay 730. After an interval relay 730 restores to open the circuit through the left-hand winding of relay 710 at contacts 737, and at contacts 738 completes a self-restoring circuit for time switch TS by way of contacts 744 and 716 and magnet 715 to return the time switch to normal position. When time switch TS reaches normal, contacts 744 open the self-restoring circuit.

When the called party disconnects and opens the called loop, back-bridge relay 810 restores and at contacts 811 disconnects the last ground from the locking circuit of relay 800. At contacts 803' and 806, relay 800 opens the locking circuit of relay 860, and at contacts 802' completes the circuits to release magnet 836. This circuit may be traced by way of contacts 822, 835, V.O.N. 819, 853', 802' and V.O.N. 823, and magnet 836. The operation of release magnet 836, in the well-known manner, releases the wipers of the connector and restores the operated vertical off-normal springs to in turn open the circuit to release magnet 836. Relay 860 restores shortly after its locking circuit is opened at contacts 806, and at contacts 868 completes the self-restoring circuit for time switch TS8. This circuit may be traced by way of contacts 822, 835, 854', 868, 847, and 838 to magnet 837. When the cams of time switch TS8 reach normal position cam 3 at contacts 847 opens the self-restoring circuit to maintain the time switch in normal position.

*Incoming toll call*

It will now be assumed that the connector of FIG. 8 is seized by way of a toll selector on a toll call to one of the parties on a called party line. Battery through the upper winding of relay 840 and contacts V.O.N. 818 mark this connector idle and seizable over the toll selector banks and relay 840 is operated over this circuit from ground forwarded over the TC lead. Line relay 820 is operated over the negative and positive leads by way of contacts 851 and 854, and 812 and 814. Line relay 820 operates relay 830. Line relay 820 is operated by the dialed digits in the same manner as previously described to seize the called line and ring the called party. When the called line was found idle, switching relay 800 operated and at contacts 809 completes a circuit from the ground fed over TC conductor from the toll selector for operating toll relay 850.

Relay 850 at contacts 851 and 854 disconnects the line relay 820 to cause the release, at contacts 853 and 856 opens points in the circuit to the back-bridge relay 810, and at contacts 852 and 855 prepares for connecting the talking conductors straight through to the toll selector which will furnish talking battery to both the calling and called parties on this toll connection. Contacts 859 completes a holding circuit for relay 800 to hold relay 800 after relay 830 restores to open the original locking circuit of relay 800. Contacts 851' connects ground in multiple with contacts 832 for the purpose of holding relay 870 operated in case the called line was found busy. Contacts 852' opens a point in the locking circuit for ring-cut-off relay 860 described for the local connection, contacts 853' opens the release circuit of the connector switch, contacts 854' opens the self-restoring circuit of the time switch TS, and contacts 855' prepares the time pulse circuit for magnet 837. Line relay 820 restores when its circuit is opened by the operation of toll relay 850 to cause relay 830 to restore. The restoration of relay 830 performs no useful function at this time because of the operation of the toll relay 850.

The called party on the party line is selectively signaled in the same manner as previously described for the local call and when the called party answers relays 870 and 860 operate if the party answers during the ringing period, or relay 860 alone operates in case the called party answers during the silent period. Contacts 865 close first to complete a circuit for fully operating ring-cut-off relay 860 and for thereafter maintaining ring-cut-off relay operated over the grounded EC conductor, which conductor is grounded until the toll operator removes such ground in order to re-ring the called party after he replaces his handset. Contacts 862 and 864 connect the talking conductors of the called substation to the transmission battery feed in the toll selector in the usual manner. Contacts 861 and 863 opens the ringing and ring control circuits, contacts 866 opens the circuit to relay 870, contacts 868 opens a point in the self-restoring circuit of time switch TS8, and contacts 867 connects the time pulse lead by way of contacts 855' and 856 to motor magnet 837. When the time pulse lead is grounded magnet 837 steps its cam one step to open contacts 846 so that ground pulses on the time pulse lead are ineffective to further operate magnet 837. The closure of contacts 847 is also ineffective at this time since contacts 868 and 854' are open. On the first step of cam 1, contacts 843 and 844 close to connect the 6000 cycle tone in simplex of the called party line to operate the transistors, such as TR61, and lockout relays, such as relays LO1, at all substations on the called party line. This circuit may be traced from the high frequency tone source of 6000 cycles, condensers C83 and C84 in multiple, conductors 791 and 792, contacts 852 and 855, 862 and 864, 801 and 802, wipers 824 and 825, called party line conductors 882 and 883, and through condensers, such as condensers C62, C63, and C64, filters TF6 to transistors, such as TR61 at all substations on the called party line. The transistors amplify the tone to cause the substation lockout relays, such as LO1, to operate at all substations. At the called substation, the operation of relay LO1 causes relay LO2 to operate by way of contacts 621, SH63, and 642 and then lock by way of contacts 621 and 631. At all other substations on the called party line, except the called party who has answered the call, the operation of their lockout relays LO1 close circuits for operating lockout relays LO3 by way of contacts 621, SH64, and 632 and these relays are locked operated by way of contacts 621 and 643. The operation of relays LO3 at their contacts 641 and 644 disconnects their substation circuits from the line conductors of the called party line thereby providing secret service for the called party. On a toll call, the time switch TS8 takes one step to apply the high frequency source for lockout and, since contacts 846 opens the time pulse circuit, the switch remains in this position until the connection is released by the toll operator regardless of the length of conversation.

In case the called party line was busy on the toll call, then combined busy and ring control relay 870 is operated from ground engaged by wiper 826, by way of contacts 892 and 808. In the same manner as for a local call, relay 870 locks by way of contacts 832, 877, 893, and 808 when relay 890 restores. As previously mentioned, the TC conductor on a toll call is grounded and when relay 870 closes contacts 878, toll relay 850 is operated by way of contacts 894. Relay 850 performs the same functions as previously described and, in this instance, since a busy line was encountered and the busy relay 870 is operated, contacts 858 connect flash busy (Flash Busy) by way of contacts 803, 873, and 855 back over the positive line conductor to the toll selector to give the toll operator a flash busy signal in the well-known manner.

The toll operator may re-ring the called subscriber after he replaces his handset by removing ground from the EC conductor to open the holding circuit of ring-cut-off relay 860. In response to the disconnection of ground from EC conductor, relay 860 restores to close the circuit to ring control relay 870 at contacts 866, and the ringing and ring control circuits at contacts 861 and 863. The operation of relay 870, during the selected ringing period, causes the called substation to be resignaled in the same manner as previously described. Ring cut-off relay 860 is reoperated when the called party answers to give the toll operator answer supervision in the well-known manner.

The release of the toll connection is under control of the toll operator by removing ground from the TC and EC leads to open the circuits to toll relay 850 and ring cut-off relay 860. Toll relay 850 restores before slow-to-release relay 860 and at contacts 859 opens the locking circuit of relay 800 which restores quickly. Relay 800 restores to release the connector wipers by way of contacts 853′ and 802′ in the same manner as previously described. Shortly thereafter relay 860 restores and at contacts 868 closes the previously traced self-restoring circuit for magnet 837 to restore the time switch TS8 to its normal position, or the position shown in FIG. 8. In normal position contacts 843 and 844 disconnect the high frequency source. When the connection to the called line is released all operated LO1 relays restore to thereby release relay LO2 at the called substation and relays LO3 at the non-called substations of this party line to thereby reconnect the non-called substations to the line conductors of the party line. All apparatus is now at normal or may be used on subsequent calls.

*Reverting call*

In order to describe a reverting call on a party line having lockout service as above described, it will be assumed that station D (FIG. 6) desires to call another substation on his own line; for example station E (FIG. 1A). In response to removing his handset line relay 760 operates over the calling loop to operate relay 740 and start the finder in search of the calling line. When the finder finds the calling line, cut-off relay 750 operates to release line relay 760 and operate relay 730 which connects the high frequency source to the calling line to lock out all substations on the party line except the calling substation in the same manner as previously described. The calling substation now dials the special reverting call digit to operate the selector to the reverting call level. Normal post springs 709 close on this level to prepare a circuit for relay 720, and when the selector finds an idle reverting call switch, switching relay 700 in the selector operates in the usual manner. At contacts 703, switching relay 700 closes ground on the test conductor by way of NP contacts 709, wiper 779 and EC bank contact 774 to relay 720 and battery. Relay 720 completes a locking circuit for itself at contacts 724 to the grounded test conductor, at contacts 723 shorts the right-hand winding of shunt field relay 710 to prevent its operation, and at contacts 721 and 722 disconnects the high frequency source from the calling line to remove the lockout on the calling line. The removal of lockout from the calling line is necessary in order to signal the called substation when making a reverting call. The removal of the lockout frequency from the line causes the operated lockout relays at all substations to restore.

Assuming now that the reverting call switch of FIG. 10 is the switch seized by the operated selector, and in response to such seizure line relay 1020 is operated over the calling loop to operate slow-to-release relay 1030 by way of contacts 1021. Relay 1030, at contacts 1031 prepares the pulsing circuit for relay 1040 and stepping magnet 1002 of the minor switch MSB, at contacts 1033 opens a point in the release circuit to release magnet 1003, at contacts 1035 disconnects battery potential through contacts 1065 and resistance R101 which normally marked this reverting call switch idle to the selector switches, and at contacts 1034 connects ground from contacts 1085 to the test, or C conductor 796 to maintain the preceding switches and relays 720 and 750 operated. Contacts 1032 complete a circuit by way of contacts 1084 for operating slow-to-release relay 1090 which at contacts 1092 connects a multiple ground to the test conductor and at contacts 1091 prepares a circuit for transmitting a reverting call tone back to the answering substation to advise him that the call he has answered is a reverting call.

Subscribers on a party line must know what digit to dial to initiate a reverting call and also what digit to dial to operate the reverting call switch so as to select the proper ringing period to selectively signal the desired substation on his party line. The digit which operates the reverting call switch corresponds to the ringing digit of the called station in order to select the correct type of ringing generator and the correct polarity of the high voltage current which conditions certain of the ringers on the party line for operation. The ringing digit also controls a line reversing relay in the reverting call switch in order to determine which line conductor is used for the high voltage direct current control for conditioning certain of the ringers and which line conductor is to be used for the ringing current. The telephone company advises the subscribers what digits to dial to call any of the substations on their own line.

Referring now to FIG. 6A and assuming that station E is to be called in a reverting call, it will be seen that since cold cathode tube T62 is biased in a negative direction then high voltage of negative 100 volts is required on the positive line conductor 602 to cause tube T62 to fire and cause station relay SR62 to operate and ground ringer S62 at contacts 611″. Since ringer S62 is biased in a positive direction it will be seen that pulsating ringing current of positive polarity is required to operate ringer S62.

Referring now to the common ringing interrupter of FIG. 9 it will be seen that the second ringing period controlled by cam 2 is required to apply the direct current 100 volts of negative polarity and the pulsating ringing current of positive polarity. The selection of the various ringing periods is controlled over wiper 1005 and the EC conductors terminating in the banks accessible to wiper 1005, while the control of the line reversing relay 1050 in the reverting call switch is controlled over the wiper 1006 dependent upon the ringing digit dialed by the calling subscriber.

In this instance, since calling station D wishes to call station E on his own line, he will dial the ring digit 8 to release and reoperate line relay 1020 eight times. On each restoration of relay 1020, contacts 1022 completes a circuit for operating relay 1040 and stepping magnet 1002 by way of contacts 1031 and 1063. Relay 1040 operates contacts 1041 and 1042 to open circuits to relays 1060 and 1050 and remains operated during pulsing. Magnet 1002 operates eight times to step wipers 1005 and 1006 to their eighth bank contacts. Shortly after pulsing, relay 1040 restores and at contacts 1041 completes a circuit by way of off-normal contacts 1004, which closed on the first step of the wipers, to relay 1060. Contacts 1042 close a circuit from the grounded eighth bank contact and wiper 1006 for operating the line reversing relay 1050. Relay 1060 operates and completes a locking circuit for itself by way of contacts 1061 and 1004, at contacts 1063 opens the pulsing circuit and at contacts 1062 prepares a circuit to relay 1010. Relay 1050 operates and completes a locking circuit for itself by way of contacts 1055 and 1004, and at contacts 1052 and 1053 reverses the ring control lead RCB and the ringing current generator lead GEN with respect to the line conductors of the calling party line.

The calling subscriber replaces his receiver after dialing the ringing digit to cause line relay 1020 to restore. At contacts 1022, relay 1020 completes a circuit by way of contacts 1031, 1062, and 1082 for operating relay 1010. Relay 1010 operates to hold relay 1030 at contacts 1015, and to prepare the circuit for the ring control relay 1070 at contacts 1016. At contacts 1012 and 1014 relay 1010 prepares the ring control and ringing circuits. When cam 2 of the ringing interrupter closes its contacts 923, 924, and 925, contacts 923 grounds EC2 conductor 902 to operate ring control relay 1070 by way of the eighth bank contact and wiper 1005, and contacts 1016. Relay 1070 operates and at contacts 1072 completes the ring control circuit for firing tubes T61 and T62 associated with stations D and E on the party line. The ring control circuit may be traced from negative 100 volt battery, contacts 924, RCB ring control conductor 905, marginal relay 1000, contacts 1072, 1054, and 1014, conductor 795, selector wiper 782, contacts 702, finder wiper 776 and bank contact 772, contacts 723, positive line conductor 602 of the party line, through station relays SR61 and SR62, and tubes T61 and T62, which are biased in a negative direction, to ground. Tubes T65 and T66 at substations 5 and 6 do not fire when negative high voltage direct current is connected to the positive line conductor because such tubes are biased in the positive direction. Both station relays SR61 and SR62 operate when their associated tubes fire to pass current and at contacts 611 and 611″ ground their associated ringers S61 and S62. In addition contacts 612 and 612″ short circuit the transmitters T at both stations D and E in order to protect the transmitters in case either party should remove his receiver during the ringing period. The station relays SR61 and SR62 have high impedance and resistance so that the marginal relay 1000 in the reverting call switch will not operate in series with these relays. Contacts 925 of the ringing interrupter simultaneously connects pulsating ringing current of positive polarity from the transformer TR90, rectifier RC91, contacts 925, GEN ringing conductor 906, resistance R100, contacts 1074, 1052, and 1012, conductor 794, selector wiper 781, contacts 701, finder wiper 775 and bank contacts 771, negative line conductor 601 to the ringers connected to conductor 601. Ringers S65 and S66 are not prepared for operation because their respective station relays are not operated. Ringer S61 is biased in a negative direction and will not respond to pulsating ringing current of positive polarity while ringer S62 of called substation E is biased in a positive direction so that ringer S62 alone is operated to selectively signal the called station.

The called subscriber may answer the call either during the ringing period or during the silent period. If the subscriber answers during the ringing period, then marginal relay 1000 is operated over the answering loop from ground through the lower winding of transformer TR90, rectifier RC91, contacts 925, conductor 906 over the previously traced ringing circuit to line conductor 601, contacts 641, operated switchhook contacts, similar to contacts SH61, impulse springs IPS of the calling device, one winding of the induction coil, similar to IC, contacts 612″, conductor 602, back over the previously traced ring control circuit through relay 1000 and contacts 924 to negative 100 volts battery. Relay 1000 operates in this circuit and at contacts 1001 completes a circuit through the lower winding of ring cut-off relay 1080 from grounded contacts 1032. Relay 1080 operates and at contacts 1081 prepares a circuit to give the answering party an audible reverting call signal. Relay 1080 at contacts 1082 opens the circuit of relay 1010, at contacts 1083 locks itself from grounded contacts 1032, at contacts 1084 opens the circuit to slow releasing relay 1090 and at contacts 1085 disconnects one of the multiple grounds from test conductor 796. Relay 1010 quickly restores when its circuit is opened at contacts 1082 to reconnect and reoperate line relay 1020 at contacts 1011 and 1013, and connects reverting call tone from the tone source by way of condenser C100 and contacts 1081 and 1011 to line conductors 794 and 601 to advise the answering substation that he has answered a reverting call and should wait a reasonable time to allow the calling party to come back on the line. In case the called party does not answer, and when the calling party comes back on the line he then hears the reverting tone advising him that the called party has not answered. Relay 1090, being slow to release, restores shortly after the restoration of relay 1010 to disconnect the reverting call tone at contacts 1091. In addition, relay 1090 disconnects the last ground from test conductor 796 to release the preceding selector and finder switches and relay 750. The release of the finder and selector switches opens the circuit to line relay 1020 to open the circuit to slow releasing relay 1030 which releases after an interval. Relay 1030 at contacts 1032 opens the locking circuit of relay 1080 to restore. At contacts 1033, relay 1030 closes the release circuit to release magnet 1003 by way of contacts 1064 to cause the minor switch MSB to restore its wipers to normal. When the wipers 1005 and 1006 reach normal position, off-normal contacts 1004 open the locking circuits of relays 1050 and 1060 to restore these relays. Relay 1060 restores and at contacts 1065 connects battery potential through resistance R101 by way of contacts 1035 to mark this reverting call switch idle and selectable by the selector switches.

When relay 1090 restored and disconnected ground from C conductor 796 relay 750 restored quickly and at contacts 751 and 752 bridges the line relay 760 across the party line to reoperate line relay 760. Relay 760 at contacts 765 completes a locking circuit for slow-to-release relay 730 by way of contacts 735 and 734 before relay 730 has had time to restore, reoperates relay 740 at contacts 764, and at contacts 763 grounds the connector test lead 884 to mark this line busy to the connectors and to maintain relay 720 operated over contacts 724 before it has had time to release, since relay 720 is also of the slow-to-release type. Since relay 720 is maintained operated, the high frequency source is not connected to the line conductors of the party line with the result that the parties are not locked out on a reverting call.

When the calling party comes back on the line after a time interval sufficiently long to properly signal the called party, the subscribers may then start conversation, Talking battery for both parties is furnished through the windings of line relay 760.

After conversation and in response to both parties replacing their handsets, line relay 760 restores to open the circuits of relays 740, 730, and 720 to thereby release these relays. The line circuit is now restored to normal and may be used on subsequent calls.

In case the called party answered the reverting call during the silent period of the ringing interrupter, then the ring cut-off relay 1080 alone is operated to cut off the ring. During the silent period relay 1070 is in restored position and if the called party responds at this time, a circuit is completed from ground, contacts 1073, 1052, and 1012, over line conductors 794 and 601 and through the answering loop at the called substation to the line conductors 602 and 795, contacts 1014, 1054, 1071, and upper winding of ring cut-off relay 1080 to battery. Relay 1080 operates and performs the same functions as previously described.

In case the last ringing digit is six or less, then wiper 1006 engages vacant contacts with the result that ring-reversing relay 1050 is not operated and therefore the RCB ring control lead 905 and the GEN generator lead 906 are not reversed with respect to the party line conductors as previously described. Under this condition the high 100 volt battery of either negative or positive polarity is connected to line conductor 601 instead of line conductor 602, and pulsating ringing current of either negative or positive polarity is connected to line conductor 602 instead of conductor 601. The cold cathode tubes T63 and T64 are biased to respond to the high voltage of negative polarity, while tubes T67 and T68 are biased to respond only to the high voltage of positive polarity to cause operation of their associated station relays, which in turn ground their associated ringers. In case negative high voltage is connected to conductor 601, tubes T63 and T64 alone fire, due to their negative bias, to cause operation of their associated station relays SR63 and SR64, which ground their associated ringers S63 and S64. Only one of the grounded ringers, however, is operated dependent upon the polarity of the pulsating ringing current, due to the biasing of the ringers. In case positive high voltage is connected to conductor 601, tubes T67 and T68 alone fire, due to their positive bias, to cause operation of the associated station relays SR67 and SR68 which operate to ground their associated ringers S67 and S68. Only one of the grounded ringers, however, is operated dependent upon the polarity of the pulsating ringing current, due to the biasing of such ringers. The selection of the desired ringing period is controlled over the EC conductors dependent upon the bank contacts selected by wiper 1005, and the reversing of the ring control lead and the ringing lead with respect to the line conductors of the party line is controlled by wiper 1006. The selected ringing period determines the polarity of the high voltage and the polarity of the pulsating ringing current so that any party on the party line may be selectively signaled in a manner apparent from the foregoing description.

*Local call (FIGS. 11, 12, and 13)*

The foregoing description explained the so-called "bilateral" type of ringing in connections using the terminal per station type of Strowger connector switches, such as shown in FIGS. 3 and 8; and in order to explain this type of ringing in connections using the terminal per line type of Strowger connector switch, such as shown in FIGS. 12 and 13, a detail description of a connection from station G to station J will now be given along with the modified substation ringing apparatus shown in FIGS. 11 and 11A for a party line. In this ringing apparatus, well-known neon tubes and dry disc rectifiers are used to reduce the cost over the party lines using the cold cathode tubes.

In response to the calling subscribed removing his handset and closing switchhook contacts SH111, the calling loop is closed to operate the line relay (not shown) in the line circuit of this party line. In a well-known manner, the operation of the line circuit line relay causes the associated distributor and finder to operate and switch the calling loop to the associated selector. In response to dialing one or more digits, the selector, or selectors, are operated in a well-known manner to extend the connection to the last switch of the switch train, such as shown in FIGS. 12 and 13. The connector shown in FIGS. 12 and 13 is marked idle and selectable by battery potential through the lower winding of relay 1250 over the local test lead 1163 and toll test lead TC. When the connector is seized from a local selector, relay 1250 is operated from ground forwarded over conductor 1163 and vertical off-normal contacts 1201, and the calling loop operates line relay 1220 by way of conductors 1161 and 1162, contacts 1212 and 1214, left-hand windings of repeat coil RC12, contacts 1268 and 1267, and winding of relay 1220 to battery and ground. Relay 1220 closes contacts 1221 to operate release relay 1240. Relay 1240 operates contacts 1243 to ground conductors 1163 and TC, and at contacts 1244 prepares the pulsing circuit for relay 1250 and vertical magnet 1204.

In response to the calling subscriber dialing the next digit, line relay 1220 restores and reoperates for each impulse of the dialed digit to operate the vertical magnet 1204 and maintain relay 1250 operated by way of contacts 1222, 1244, and 1251. The vertical magnet 1204 operates the connector wipers step-by-step opposite the vertical level of bank contacts corresponding to the dialed digit. On the first vertical step vertical off-normal contacts 1201 and 1202 open and contacts 1203 close. Shortly after dialing slow-to-release relay 1250 restores to transfer the pulsing circuit to relay 1370 and rotary magnet 1316 at contacts 1252.

In response to dialing the next to the last digit or the line selecting digit, the line relay operates relay 1370 and rotary magnet 1316 over the pulsing circuit by way of contacts 1222, 1244, 1252, and 1352. The rotary magnet rotates the wipers step by step in the selected vertical level into engagement with the bank contacts terminating the called line. Relay 1370 is maintained operated during the rotary movement and opens contacts 1374 to prevent the operation of relay 1350 in case the busy relay 1360 should be operated by test wiper 1303 engaging grounded contacts of busy lines during the rotary movement. At contacts 1372, relay 1370 prepares the circuit to the busy relay 1360, and in case the called line is busy conductor 1393 will be grounded to operate relay 1360 by way of test wiper 1303 and contacts 1372. Shortly after dialing the line selecting digit, slow-to-release relay 1370 restores to operate transfer relay 1350 by way of contacts 1374 and 1365 if the called line is busy and at contacts 1373 closes a locking circuit for busy relay 1360 by way of contacts 1242, 1364, and 1373. The busy relay 1360, at contacts 1362, prepares a circuit for connecting busy tone to the calling line.

In case the called line is idle, then busy relay 1360 is not operated and when relay 1370 restores, a circuit is completed for operating switching relay 1380, contacts 1371, test wiper 1303 and over conductor 1393 to the cut-off relay (not shown) in the line circuit of the called line. Relay 1380 first closes its X contacts 1383 to complete a circuit through the lower winding from grounded contacts 1241 to fully operate relay 1380. At contacts 1381 and 1382, relay 1380 prepares the ringing circuits, and contacts 1382, relay 1380 prepares the ringing circuits, and contacts 1384 grounds conductor 1393 to hold the cut-off relay (not shown) in the called line circuit operated and to busy the called line to other connectors, at contacts 1381′ prepares a locking circuit for ring cut-off relay 1270, at contacts 1386 completes a circuit from contacts 1374 for operating transfer relay 1350, at contacts 1387 opens the release circuits, and at contacts 1388 and 1389 prepares circuits to the ring control relays 1280 and 1310.

It will be noted that the transfer relay 1350 is operated regardless of whether the called line is busy or idle and at contacts 1351 transfers the pulsing circuit to relay 1330 and the stepping magnet of the associated minor switch.

The calling subscriber now dials the last, or ringing digit, of the called party on the party line and in response to this digit the line relay 1220 operates relay 1330 and pulses stepping magnet by way of contacts 1222, 1244, 1252, 1351, and 1343. Relay 1330, being slow to release, is maintained operated during the dialing of the last digit. Stepping magnet 1306 is operated to rotate wiper 1305 one step for each impulse received to select the desired ringing period and either control relay 1280 or relay 1310 dependent upon the number of impulses in the ringing digit. Relay 1330 restores after an interval, and at contacts 1331 completes a circuit for operating relay 1340 by way of the minor switch off-normal contacts 1308 which closed on the first step of wiper 1305. Relay 1340 operates and at contacts 1341 connects the busy tone to the repeat coil RC12 to give the calling subscriber busy tone in case the called line was busy. At contacts 1342, relay 1340 prepares a circuit for toll relay 1260 which is used only on toll calls, contacts 1343 opens the pulsing circuit, and contacts 1346 and 1347 connects either one of the ring control relays 1280 or 1310 to the ringing interrupter (FIG. 9) dependent upon the operated position of wiper 1305.

Assuming now that the called party line substation is similar to that shown in FIG. 11 or station 1, it will be seen that high voltage of negative polarity is required on the positive line conductor to fire the neon tube, such as N111, because the rectifier, such as R111, is poled to pass negative polarity of current. When the neon tube fires, current flows through the associated station relay, such as SR111, to open the substation talking circuit and connect the ringer, such as S111, to ground. It will also be seen that the ringer is biased to respond only to the positive polarity of ringing current on the negative line conductor. In order to selectively ring this called substation on the called party line, the digit 8 is dialed to advance wiper 1305 to its eighth bank contact to engage the EC2 conductor to select the second ringing period of the ringing interrupter (FIG. 9) and the connector ring control relay 1310.

When cam 2 of the ringing interrupter closes contacts 923, 924, and 925, the ring control relay 1310 is operated to simultaneously connect high voltage 100 volts of negative polarity to the positive line conductor of the called party line and pulsating ringing current of positive polarity to the negative line conductor of the called party line to selectively ring only the called substation on the called party line. The closure of contacts 923 operates ring control relay 1310 by way of EC2 conductor 902, eighth bank contact, wiper 1205, and upper bank UB2, contacts 1389, 1347, and 1279. Relay 1310, at contacts 1314 connects the high voltage of negative polarity to the positive line conductor of the called party line as follows: negative 100 volts, contacts 924, RCB ring control conductor 905, winding of marginal relay 1320, contacts 1314, 1283, 1274, and 1382, wiper 1302, the positive line conductor 1392 of the called party line, through the station relay, similar to relay SR111 (FIG. 11), neon tube, similar to neon tube N111, rectifier, similar to rectifier R111, to ground. The station relay at the called substation operates to open the talking circuit at back contacts, similar to contacts 1111, in order to prevent the high voltage and ringing current from damaging the transmitter or receiver in case the called party answered during the ringing period, and to connect the ringer, similar to ringer S111, to ground. The station relays, such as SR111, due to their high resistance windings, do not permit the connector relay 1320 to operate in series therewith. Relay 1310 at contacts 1312 connects pulsating ringing current of positive polarity to the negative line conductor of the called party line as follows: from ground through the lower winding of 20 cycle ringing current transformer TR90, rectifier RC91 which passes pulsing ringing current of positive polarity, contacts 925, GEN conductor 906, resistance R131, contacts 1312, 1281, 1271, and 1381, wiper 1301, negative line conductor 1391 of the called party line, through ringer, such as ringer S111, and the operated contacts, similar to contacts 1112, of the called substation station relay, at the called station is biased to respond to pulsating ringing current of positive polarity to thereby signal the called subscriber on the party line.

None of the ringers at the remaining stations on the party line are operated at this time for the following reasons. Referring now to FIG. 11A, it will be seen that with the high voltage of negative polarity connected to the positive line conductor 1122, station relays SR111 and SR112 are the only station relays operated on this party line because of rectifiers R111 and R112 being biased in a negative direction. Station relays SR115 and SR116 do not operate because rectifiers R115 and R116 are biased in a positive direction with the result that their associated neon tubes N115 and N116 will not break down and pass current. At station 2, the ringer S112 does not respond to pulsating ringing current of positive polarity because it is biased in the negative direction and since ringers S111 and S112 are the only ringers connected to ground, ringer S111 alone responds to signal the called subscriber.

Assuming now that station 3 (FIG. 11A) is the substation called, then the ringing digit is the digit 2 to operate the minor switch wiper 1305 to engage its second bank contact to again select the second ringing period, but in this case the application of the high voltage and the pulsating ringing current is reversed with respect to the line conductors of the called line by the operation of ring control relay 1280 to that just previously described. In this instance, contacts 923 completes a circuit for operating relay 1280, by way of EC2 conductor 902, second bank contact, wiper 1305, upper bank UB1, contacts 1388, 1346, and 1278. Relay 1280 connects negative 100 volts at contacts 924 by way of RCB conductor 905, relay 1320, contacts 1282, 1271, and 1381, wiper 1301, negative line conductor 1391 (now assumed to be conductor 1121), station relays SR113 and SR114, neon tubes N113 and N114, rectifiers R113 and R114 to ground. Both tubes N113 and N114, being biased in a negative direction by their associated rectifiers R113 and R114, break down and pass current to permit station relays SR113 and SR114 to operate and connect their respective ringers S113 and S114 to ground. Station relays SR117 and SR118 do not operate because of the positive bias of rectifiers R117 and R118. Relay 1280 connects positive pulsating ringing current at contacts 925 by way of GEN conductor 906, resistance R131, contacts 1284, 1274, and 1382, wiper 1302, conductor 1392 (now assumed to be conductor 1122), ringers S113 and S114 and operated contacts of station relays SR113 and SR114, to ground. As will be noted, ringer S113 is biased to respond only to pulsating ringing current of positive polarity, while ringer S114 is biased to respond only to pulsating ringing current of positive polarity, with the result that ringer S113 is the only ringer operated to selectively signal station 3 on this party line. In a manner apparent from the drawings and the foregoing description any party on the party line may be selectively signaled dependent upon the operated position of the connector minor switch wiper 1305, which is set on a particular bank contact to select the proper ringing period of the ringing interrupter and the proper ring control relay in the connector.

The positive ringing pulses on line conductor 1121 that operate station 1 ringer S111 may probably be of high enough voltage to fire tubes N117 and N118 and try to operate station relays SR117 and SR118. The polarity is wrong to fire tubes N113 and N114. If the station relays SR117 and SR118 should operate enough to close their contacts when station 1 is being rung, ringer S118 would operate from negative polarity on line conductor 1122 and give only a tap of the ringer, while ringer S117, being biased in a positive direction, would not respond.

As previously described, either ring control relay 1280 or 1310 are intermittently operated by interrupter contacts 923 to selectively operate the ringer of the called substation. The called subscriber may answer during the ringing period or between ringing periods. Assuming now that the called substation shown in FIG. 11 is the called station, and that the subscriber answers during the ringing period by removing his handset to close switchhook contacts SH111. The ringer S111 continues to ring during the ringing period even through the subscriber has answered, but at the end of the ringing period, station relay SR111 restores and at contacts 1111 closes the called loop to operate the connector ring cut-off relay 1270. Relay 1270 also operates during the silent, or non-ringing period, over the answer loop as follows: the substation loop including contacts 1111, switchhook contacts SH111, impulse springs IPS, upper winding of the induction coil, transmitter T, to line conductors 1121 and 1122, through the line circuit of the called line to conductors 1391 and 1392, line wipers 1391 and 1302, contacts 1381 and 1382, 1271 and 1274, 1281 and 1283, and 1311 and 1313, to battery through the lower winding of ring cut-off relay 1270 and to ground. Relay 1270 first closes its contacts 1277 to complete a locking circuit for itself, and for fully operating its remaining contacts, by way of contacts 1263, 1381', and 1384 to ground. At contacts 1278 and 1279, relay 1270 opens the circuit to the ring control relays 1280 and 1310, at contacts 1271 and 1274 opens the ringing circuits, and at contacts 1272 and 1275 completes the talking circuit and connects the called loop to operate back-bridge relay 1230. At contacts 1231, relay 1230 connects a multiple ground to hold relay 1380 operated, and at contacts 1232 completes a circuit for operating reversing relay 1210 by way of contacts 1265. Relay 1210 operates and reverses battery back to the calling subscriber for supervisory purposes at contacts 1211 and 1213. The talking circuit includes the repeat coil RC12 and talking battery to the calling station is furnished through the windings of line relay 1220, while talking battery for the called station is furnished through the windings of the back-bridge relay 1230.

After conversation and in response to the calling substation replacing his handset on the cradle, switchhook springs SH111 opens the calling loop to restore connector line relay 1220 which opens the circuit to release relay 1240 at contacts 1221, while contacts 1222 prepares a point in the release circuit. Relay 1240 restores after an interval and at contacts 1241 disconnects one of the multiple grounds holding relay 1380 operated. At contacts 1243 relay 1240 disconnects ground from C test conductor 1163, and at contacts 1245 further prepares the release circuits. The disconnection of ground from conductor 1163 causes the release of the preceding switches in the switch train in a well-known manner.

When the called party hangs up, back-bridge relay 1230 restores to release relay 1210 at contacts 1212, and at contacts 1231 opens the locking circuit of relay 1380 which restores. Relay 1380, at contacts 1384 disconnects ground from wiper 1303 to restore the cut-off relay in the called line circuit, at contacts 1381' opens the locking circuit of ring cut-off relay 1270 to restore relay 1270, at contacts 1386 releases relay 1350, and at contacts 1387 operates release magnet 1307 of the minor switch by way of contacts 1344, 1387, 1264, V.O.N. 1203, 1245, and 1222. Release magnet 1307 operates to restore wiper 1305 of the ringing minor switch to normal position where contacts 1308 open to restore relay 1340. Relay 1340 restores and at contacts 1345 transfers the release circuit from release magnet 1307 to connector release magnet 1315. Release magnet 1315 operates to release the connector wipers in the well-known manner and when the wipers are restored to normal V.O.N. contacts 1203 open the circuit to release magnet 1315. V.O.N. contacts 1201 and 1202 close to connect battery potential through the lower winding of relay 1250 to test conductors 1163 and TC to mark this connector idle and selectable.

*Toll call*

In order to describe the operation of the connector (FIGS. 12 and 13) in a toll call it will be assumed that a toll operator has seized this connector by way of the toll selector, diagrammatically illustrated in FIG. 1A, and over the negative, positive, TC and EC leads. The TC and EC toll leads are grounded in the well-known manner and ground on the TC lead operates relay 1250 by way of V.O.N. contacts 1202, while the line relay 1220 is operated over the negative and positive toll line conductors. The toll operator now dials the two digits necessary to select the called party line and then the correct ringing digit to selectively signal the called party on the party line. Line relay 1220 responds to the line selecting digits to operate the connector wipers to engage the called line, while the ringing digit operates the ringing minor switch wiper 1305 to select the proper ringing period and one of the ring control relays 1280 and 1310 in the same manner as previously described for a local call. However, in a toll call the TC conductor is grounded, and when switching relay 1380 operates, when the called line is found idle, toll relay 1260 is operated by way of grounded conductor TC, contacts 1342 and 1385. Relay 1260, at contacts 1261 connects a multiple ground to hold relay 1380 operated over its locking circuit, and at contacts 1263 opens a point in the previously described local locking circuit for ring cut-off relay 1270 so that the ring cut-off relay, after operation, is now locked operated over the ground EC toll lead. Toll relay 1260 at contacts 1264 opens a point in the release circuit to give the toll operator control of the release, at contacts 1265 opens a point in the circuit to relay 1210, at contacts 1266 prepares a circuit for bridging the left-hand windings of repeat coil RC12 across the negative and positive toll line conductors, and at contacts 1267 and 1268 disconnects line relay 1220 from the toll line conductors. Line relay 1220 restores and opens the circuit to release relay 1240 which restores after an interval.

The called subscriber is signaled in the same manner as described for a local call and when the called party answers ring cut-off relay 1270 operates over the answering loop to cut off the ring and now locks by way of contacts 1277 and grounded EC conductor. Relay 1270 closes its contacts 1272 and 1275 to operate back-bridge relay 1230 over the answer loop to thereby feed talking battery to the called party. Relay 1230, at contacts 1233, closes an answer bridge, by way of contacts 1266, the left-hand windings of repeat coil RC12, and contacts 1212 and 1214, across the negative and positive toll line conductors, to the toll selector to give the operator answer supervision in the well-known manner.

In case the called party hangs up, the answer loop to relay 1230 is opened and relay 1230 restores to open the answer bridge at contacts 1233 to advise the toll operator that the called party has hung up. In case the toll operator desires to re-ring the called party she will momentarily remove ground from the EC toll lead, in the well-known manner, to restore ring cut-off relay 1270. Relay 1270, at contacts 1271 and 1274 releases the ringing circuits while contacts 1278 and 1279 recloses the circuits to ring control relays 1280 and 1310 to enable the ringing period selected by wiper 1305 to re-ring the called party in the same manner as described for the initial ring.

The release of the connection is under control of the toll operator who disconnects ground from the TC toll lead to restore toll relay 1260. Relay 1260, at contacts 1261 disconnects ground from the locking circuit of relay 1380 to cause relay 1380 to restore and release the connector in the same manner as described for the release of a local call.

The reverting call switch (FIG. 10) is also used by subscriber lines, such as shown in FIGS. 11 and 11A and the operation of the reverting call switch for such lines is the same as that previously described, since the same ringing interrupter (FIG. 9) is used. The station relays and ringers of FIG. 11A are selectively operated in the same manner as previously described by the application of high voltage of one or the opposite polarity to one line conductor, simultaneously with the application of pulsating ringing current of one or the opposite polarity to the other line conductor. Due to the biasing of the rings, and the biasing of the neon tubes and their associated station relays, any one of the ringers may be selectively operated to signal the called party in the same manner as described for the ringing by the connector of FIGS. 12 and 13. From the foregoing it will be seen that the ringing interrupter (FIG. 9) may be used with a connector (FIG. 8) of the terminal per station type, and may also be used with a connector (FIGS. 12 and 13) of the terminal per line type.

The features and modifications of the invention having been described and ascertained, what is considered to be new and desired to have protected by Letters Patent will now be pointed out in the appended claims.

What is claimed is:

1. In a party line selective ringing and lockout telephone system, an exchange, a party line having a plurality of stations, said party line including a pair of line conductors interconnecting said exchange and said stations, station connect means at each station normally connecting all said stations to said line conductors, means for selectively signaling a called one of said stations on said party line over said line conductors, a high frequency tone source at said exchange, tone connecting means operated responsive to the subscriber at said called station answering for connecting said source to both said line conductors in parallel, means comprising a transistor connected in simplex of said line conductors at each station for detecting the presence of said high frequency tone source connected to said line conductors and for amplifying such high frequency tone current, means at each station whereby said amplified current is effective to operate only said station connect means at all non-answering stations on said line to disconnect all said non-answering stations from said line conductors, means for terminating said connection of said source to said line conductors, said operated station connect means at all said non-answering stations restoring in response to said termination to reconnect all said non-answering stations to said line conductors.

2. In a party line selective ringing and lockout telephone system as claimed in claim 1 including a timing device initiated in response to said called station answering to operate said tone connecting means, and said timing device operating said terminating means a predetermined time after its initiation.

3. In a party line selective ringing and lockout telephone system as claimed in claim 1 including means for transmitting an audible tone to said called station prior to the operation of said terminating means.

4. In a party line selective ringing and lockout telephone system as claimed in claim 1 including said first means for selectively signaling said called station and a toll switch train for establishing a toll connection to said called station, and means operative in the event a toll connection is established to said called station for disabling said terminating means to thereby prevent reconnection of said non-answering stations to said line conductors.

5. In a party line lockout telephone system, an exchange, a party line having a plurality of stations, said party line including a pair of line conductors interconnecting said exchange and said stations, station connect means at each station normally connecting all said stations to said line conductors, a high frequency tone source at said exchange, tone connecting means responsive to the initiation of a call by one of said stations for connecting said source to both said line conductors in parallel, means comprising a transistor connected in simplex of said line conductors at each station for detecting the presence of said high frequency tone source connected to said line conductors and for amplifying such high frequency tone current, means at each station whereby said amplified current is effective to operate only said station connect means at all non-calling stations on said line to disconnect all said non-calling stations from said line conductors, means for terminating said connection of said source to said line conductors, said operated station connect means at all said non-calling stations restoring in response to said termination to reconnect all said non-calling stations to said line conductors.

6. In a party line lockout telephone system as claimed in claim 5 including a called line, means for establishing a talking connection between said calling station and said called line, a timing device, means for initiating the operation of said timing device in response to the subscriber on said called line answering, and said timing device operating said terminating means a predetermined time after its initiation.

7. In a party line lockout telephone system as claimed in claim 5 wherein said terminating means is operated in response to said calling station initiating a reverting call to another station on said line to thereby reconnect all said stations to said line conductors.

8. In a party line lockout telephone system as claimed in claim 5 including means for transmitting an audible tone to said calling station prior to the operation of said terminating means.

References Cited in the file of this patent

UNITED STATES PATENTS 2,873,316 Power ................ Feb. 10, 1959